(12) United States Patent
Wan et al.

(10) Patent No.: US 11,995,020 B2
(45) Date of Patent: May 28, 2024

(54) PCIe DATA TRANSMISSION METHOD AND APPARATUS

(71) Applicant: Huawei Technologies Co., Ltd., Shenzhen (CN)

(72) Inventors: Lei Wan, Beijing (CN); Pengxin Bao, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 17/871,396

(22) Filed: Jul. 22, 2022

(65) Prior Publication Data

US 2022/0374385 A1 Nov. 24, 2022

Related U.S. Application Data

(63) Continuation of application No. PCT/CN2020/073921, filed on Jan. 22, 2020.

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
None
See application file for complete search history.

(56) References Cited

U.S. PATENT DOCUMENTS

| 9,280,290 | B2 | 3/2016 | Feehrer et al. |
| 2013/0259053 | A1 | 10/2013 | Sato |
| 2016/0371221 | A1* | 12/2016 | Rosenberg ......... G06F 13/4022 |
| 2018/0101498 | A1 | 4/2018 | Cosby et al. |
| 2019/0332137 | A1* | 10/2019 | Benjamini ......... G06F 13/4282 |

FOREIGN PATENT DOCUMENTS

| CN | 108471384 A | 8/2018 |
| CN | 109410117 A | 3/2019 |
| WO | 2015016882 A1 | 2/2015 |

OTHER PUBLICATIONS

Ajanovic, Jasmin. "PCI Express 3.0 Overview." In Hot Chips Symposium, Aug. 23, 2009. pp. 1-61. (Year: 2009).*
Wagh Mahesh: "PCIe 3.0/2.1 Protocol Update", Dec. 31, 2011 pp. 1-35, XP055980142, 35 pages.
PCI Express Base Specification Revision 5.0, Version 1.0, May 22, 2019, 1299 Pages.

* cited by examiner

*Primary Examiner* — Farley Abad
*Assistant Examiner* — Dayton Lewis-Taylor
(74) *Attorney, Agent, or Firm* — Conley Rose, P.C.

(57) ABSTRACT

A Peripheral Component Interconnect Express (PCIe) data transmission method includes a first node that obtains a transaction layer packet (TLP). The TLP includes a TLP header, a TLP extension header, and data. The TLP header includes a type field, an Fmt field, and a reserved bit, and where the type field, the Fmt field, the reserved bit, and the TLP extension header indicate a data type of the data and at least one piece of attribute information corresponding to the data type such that, information, the data type and the at least one piece of the attribute information, to transmit the data is indicated using the type field, the Fmt field, the reserved bit, and the TLP extension header in the TLP.

20 Claims, 17 Drawing Sheets

| TLP prefix H bytes | TLP header 12/16 bytes | TLP extension header | Data payload 0 to N bytes | TLP digest 4 bytes |

| TLP prefix H bytes | TLP header 12/16 bytes | Data payload 0 to 4K bytes | TLP digest 4 bytes |

FIG. 3A

| TLP prefix H bytes | TLP header 12/16 bytes | TLP extension header | Data payload 0 to N bytes | TLP digest 4 bytes |

FIG. 3B

PCIe DATA TRANSMISSION METHOD AND APPARATUS

CROSS-REFERENCE TO RELATED APPLICATIONS

This is a continuation of International Patent Application No. PCT/CN2020/073921 filed on Jan. 22, 2020, which is hereby incorporated by reference in its entirety.

TECHNICAL FIELD

This disclosure relates to the field of communication technologies, and in particular, to a Peripheral Component Interconnect Express (PCIe)-based data transmission method and apparatus.

BACKGROUND

PCIe is a high-speed short-distance communications interface, and is widely used in devices such as a computer and a test instrument. Because the PCIe can quickly directly read/write a memory and provide high-bandwidth communication, some vehicle enterprises extend a transmission distance of the PCIe to serve as a large-data-volume communication port for an intra-vehicle network. A PCIe system includes a root complex (or a root), a switch, and an endpoint. The root is responsible for managing all buses and nodes in the PCIe system; the switch is used as a node for data forwarding, and may be used as a bridge connecting nodes such as the root, another switch, and the endpoint; and the endpoint is an endpoint that can send or receive data.

In an existing PCIe system, only a root knows a specific function of each endpoint and a specific service type of data that is transmitted, but any two endpoints do not know each other's functions or a service type of data that is transmitted. Therefore, any two endpoints cannot directly communicate with each other, and need to communicate with each other by using the root. In the PCIe system, due to a mechanism in which two endpoints need to communicate with each other by using the root, another transmission interface needs to be used in an intra-vehicle network. If there are a plurality of types of transmission interfaces in the intra-vehicle network, information exchange between various transmission interfaces requires interface conversion, and this greatly improves complexity of the intra-vehicle network, especially in a high-speed communication scenario.

SUMMARY

Embodiments of this disclosure provide a PCIe-based data transmission method and apparatus, so that any two endpoints in a PCIe system can communicate without using a root, to reduce complexity of an intra-vehicle network.

According to a first aspect, an embodiment of this disclosure provides a PCIe-based data transmission method, and the method includes that a first node obtains a transaction layer packet (TLP), and then sends the TLP to a second node, where the TLP includes a TLP header, a TLP extension header, and data, the TLP header includes a type field, an Fmt field, and a reserved bit, and the type field, the Fmt field, the reserved bit, and the TLP extension header are used to indicate a data type of the data and at least one piece of attribute information corresponding to the data type.

The first node may be an endpoint, or may be a switch.

Based on this solution, information, that is, the data type of the data and the at least one piece of attribute information corresponding to the data type, required to transmit the data is indicated by using the type field, the Fmt field, the reserved bit, and the TLP extension header in the TLP. In this way, any two endpoints in a PCIe system can communicate with each other without using a root, so that complexity of an intra-vehicle network can be reduced.

In a possible design, the type field indicates the data type, the Fmt field indicates first attribute information of the data type, the reserved bit indicates second attribute information of the data type, and the TLP extension header indicates third attribute information of the data type.

In this design, the type field, the Fmt field, the reserved bit, and the TLP extension header may separately indicate different information, so that another node communicating with the first node may parse any one of the four fields to determine that the solution in this embodiment of this disclosure is used.

In a possible design, the type field, the Fmt field, and the reserved bit are jointly coded to indicate the data type, and the TLP extension header is used to indicate the at least one piece of attribute information corresponding to the data type.

In this design, in a manner in which the type field, the Fmt field, and the reserved bit in the TLP header may be jointly coded to indicate the data type and the TLP extension header indicates the attribute information corresponding to the data type, the information required to transmit the data can be indicated in a first TLP. In this way, any two endpoints in the PCIe system can communicate with each other without using the root, so that complexity of the intra-vehicle network can be reduced.

In a possible design, the reserved bit includes a ninth bit and/or a thirteenth bit in the TLP header.

In a possible design, the reserved bit includes a ninth bit and/or a thirteenth bit in the TLP header, the type field, the Fmt field, the ninth bit in the TLP header, and the thirteenth bit in the TLP header are grouped into at least two groups of fields, a first group of fields in the at least two groups of fields are used to indicate the data type, each group of fields in the at least two groups of fields except the first group of fields indicate different attribute information corresponding to the data type, and the TLP extension header indicates attribute information, corresponding to the data type, other than the attribute information indicated by the at least two groups of fields.

For example, the reserved bit includes the ninth bit or the thirteenth bit in the TLP header, the type field, the Fmt field, and the reserved bit may be grouped into two groups of fields, a first group of fields are used to indicate the data type, a second group of fields indicate attribute information corresponding to the data type, and the TLP extension header indicates attribute information, corresponding to the data type, other than the attribute information indicated by the second group of fields.

For another example, the reserved bit includes the ninth bit and the thirteenth bit in the TLP header, the type field, the Fmt field, the ninth bit in the TLP header, and the thirteenth bit in the TLP header may be grouped into two groups of fields, a first group of fields are used to indicate the data type, a second group of fields indicate attribute information corresponding to the data type, and the TLP extension header indicates attribute information, corresponding to the data type, other than the attribute information indicated by the second group of fields.

In the foregoing design, four fields, namely, the type field, the Fmt field, the ninth bit in the TLP header, and the thirteenth bit in the TLP header may be randomly combined into two or three groups of fields, and each group of fields indicate different information, so that the information required to transmit the data can be indicated in a first TLP. In this way, any two endpoints in the PCIe system can communicate with each other without using the root, so that complexity of the intra-vehicle network can be reduced.

In a possible design, a value of the type field and/or a value of the Fmt field are/is reserved values/a reserved value.

In this design, the reserved value of the type field and/or the reserved value of the Fmt field are/is used, so that the PCIe system can be compatible with a conventional data transmission method in the PCIe system and the data transmission method provided in this embodiment of this disclosure.

In a possible design, the TLP header further includes a first field, and the first field indicates attribute information, corresponding to the data type, other than the at least one piece of attribute information.

In this design, the first TLP can indicate more attribute information.

In a possible design, the first field is a byte 4 to a byte 15 or a byte 4 to a byte 11 of the TLP header.

In this design, 16 bytes or 12 bytes may be included in the TLP header, and the first field is used to indicate some or all attribute information of the data type.

In a possible design, the first field further includes an identifier of a third node.

In this design, the second node that receives the first TLP may determine a routing path based on the identifier of the third node, so that the TLP can be accurately sent to a destination node by using the determined routing path without using the root.

In a possible design, the data type includes any one or more of an image, audio, control-type information, stream write (SWRITE), and security.

In a possible design, attribute information corresponding to the image may include an image data type, pixel bit-quantization depth, resolution, and segment indication information.

In a possible design, attribute information corresponding to the audio may include a sampling quantization format, sampling frequency, quantization depth, and a channel quantity/a quantity of channels.

In a possible design, attribute information corresponding to the control-type information may include a control-type information type and an amount of control information of each type.

In a possible design, attribute information corresponding to the security may include a message type, a format indication, and encrypted or not.

In a possible design, attribute information corresponding to SWRITE may include an alignment manner.

According to a second aspect, an embodiment of this disclosure provides a PCIe-based data transmission method, and the method includes that a second node receives a first TLP from a first node, and the second node sends a second TLP to a third node, where a TLP header in a TLP includes a type field, an Fmt field, and a reserved bit, the type field, the Fmt field, the reserved bit, and a TLP extension header in the TLP are used to indicate a data type of data and at least one piece of attribute information corresponding to the data type, and the TLP includes the first TLP and/or the second TLP.

Herein, the first TLP and the second TLP may be a same TLP, or may be different TLPs, or it may be understood as that content of data included in the first TLP and content of data included in the second TLP are the same. The second node may be an endpoint, or may be a switch.

Based on this solution, information, that is, the data type of the data and the at least one piece of attribute information corresponding to the data type, required to transmit the data is indicated by using the type field, the Fmt field, the reserved bit, and the TLP extension header in the TLP. In this way, any two endpoints in a PCIe system can communicate with each other without using a root, so that complexity of an intra-vehicle network can be reduced.

In a possible design, the type field indicates the data type, the Fmt field indicates first attribute information of the data type, the reserved bit indicates second attribute information of the data type, and the TLP extension header indicates third attribute information of the data type.

In this design, the type field, the Fmt field, the reserved bit, and the TLP extension header may separately indicate different information, so that another node communicating with the first node may parse any one of the four fields to determine that the solution provided in this disclosure is used.

In a possible design, the type field, the Fmt field, and the reserved bit are jointly coded to indicate the data type, and the TLP extension header is used to indicate the at least one piece of attribute information corresponding to the data type.

In this design, in a manner in which the type field, the Fmt field, and the reserved bit in the TLP header may be jointly coded to indicate the data type and the TLP extension header indicates the attribute information corresponding to the data type, the information required to transmit the data can be indicated in the first TLP. In this way, any two endpoints in the PCIe system can communicate with each other without using the root, so that complexity of the intra-vehicle network can be reduced.

In a possible design, the reserved bit includes a ninth bit and/or a thirteenth bit in the TLP header.

In a possible design, the reserved bit includes a ninth bit and/or a thirteenth bit in the TLP header, the type field, the Fmt field, the ninth bit in the TLP header, and the thirteenth bit in the TLP header are grouped into at least two groups of fields, a first group of fields in the at least two groups of fields are used to indicate the data type, each group of fields in the at least two groups of fields except the first group of fields indicate different attribute information corresponding to the data type, and the TLP extension header indicates attribute information, corresponding to the data type, other than the attribute information indicated by the at least two groups of fields.

For example, the reserved bit includes the ninth bit or the thirteenth bit in the TLP header, the type field, the Fmt field, and the reserved bit may be grouped into two groups of fields, a first group of fields are used to indicate the data type, a second group of fields indicate attribute information corresponding to the data type, and the TLP extension header indicates attribute information, corresponding to the data type, other than the attribute information indicated by the second group of fields.

For another example, the reserved bit includes the ninth bit and the thirteenth bit in the TLP header, the type field, the Fmt field, the ninth bit in the TLP header, and the thirteenth bit in the TLP header may be grouped into two groups of fields, a first group of fields are used to indicate the data type, a second group of fields indicate attribute information corresponding to the data type, and the TLP extension header indicates attribute information, corresponding to the data type, other than the attribute information indicated by the second group of fields.

In the foregoing design, four fields, namely, the type field, the Fmt field, the ninth bit in the TLP header, and the thirteenth bit in the TLP header may be randomly combined into two or three groups of fields, and each group of fields indicate different information, so that the information required to transmit the data can be indicated in the first TLP. In this way, any two endpoints in the PCIe system can communicate with each other without using the root, so that complexity of the intra-vehicle network can be reduced.

In a possible design, a value of the type field and/or a value of the Fmt field are/is reserved values/a reserved value.

In this design, the reserved value of the type field and/or the reserved value of the Fmt field are/is used, so that the PCIe system can be compatible with a conventional data transmission method in the PCIe system and the data transmission method provided in this embodiment of this disclosure.

In a possible design, the TLP header further includes a first field, and the first field indicates attribute information, corresponding to the data type, other than the at least one piece of attribute information.

In this design, the first TLP can indicate more attribute information.

In a possible design, the first field is a byte 4 to a byte 15 or a byte 4 to a byte 11 of the TLP header.

In this design, 16 bytes or 12 bytes may be included in the TLP header, and the first field is used to indicate some or all attribute information of the data type.

In a possible design, the first field further includes an identifier of the third node. Before the second node sends the second TLP to the third node, the method further includes that the second node determines a routing path based on the identifier of the third node and route information, and the second node sends the second TLP to the third node based on the routing path.

In this design, the second node that receives the first TLP may determine the routing path based on the identifier of the third node, so that the TLP can be accurately sent to a destination node by using the determined routing path without using the root.

In a possible design, the data type includes any one or more of an image, audio, control-type information, SWRITE, and security.

In a possible design, attribute information corresponding to the image may include an image data type, pixel bit-quantization depth, resolution, and segment indication information.

In a possible design, attribute information corresponding to the audio may include a sampling quantization format, sampling frequency, quantization depth, and a channel quantity/a quantity of channels.

In a possible design, attribute information corresponding to the control-type information may include a control-type information type and an amount of control information of each type.

In a possible design, attribute information corresponding to the security may include a message type, a format indication, and encrypted or not.

In a possible design, attribute information corresponding to SWRITE may include an alignment manner.

According to a third aspect, an embodiment of this disclosure provides a PCIe-based data transmission method, and the method includes that a third node receives a TLP from a second node, where the TLP includes a TLP header, a TLP extension header, and data, the TLP header includes a type field, an Fmt field, and a reserved bit, and the type field, the Fmt field, the reserved bit, and the TLP extension header are used to indicate a data type of the data and at least one piece of attribute information corresponding to the data type; and the third node obtains the data in the TLP based on the data type of the data and the at least one piece of attribute information corresponding to the data type.

The third node may be an endpoint, or may be a switch.

Based on this solution, information, that is, the data type of the data and the at least one piece of attribute information corresponding to the data type, required to transmit the data is indicated by using the type field, the Fmt field, the reserved bit, and the TLP extension header in the TLP. In this way, any two endpoints in a PCIe system can communicate with each other without using a root, so that complexity of an intra-vehicle network can be reduced.

In a possible design, the type field indicates the data type, the Fmt field indicates first attribute information of the data type, the reserved bit indicates second attribute information of the data type, and the TLP extension header indicates third attribute information of the data type.

In this design, the type field, the Fmt field, the reserved bit, and the TLP extension header may separately indicate different information, so that another node communicating with a first node may parse any one of the four fields to determine that the solution provided in this disclosure is used.

In a possible design, the type field, the Fmt field, and the reserved bit are jointly coded to indicate the data type, and the TLP extension header is used to indicate the at least one piece of attribute information corresponding to the data type.

In this design, in a manner in which the type field, the Fmt field, and the reserved bit in the TLP header may be jointly coded to indicate the data type and the TLP extension header indicates the attribute information corresponding to the data type, the information required to transmit the data can be indicated in a first TLP. In this way, any two endpoints in the PCIe system can communicate with each other without using the root, so that complexity of the intra-vehicle network can be reduced.

In a possible design, the reserved bit includes a ninth bit and/or a thirteenth bit in the TLP header.

In a possible design, the reserved bit includes a ninth bit and/or a thirteenth bit in the TLP header, the type field, the Fmt field, the ninth bit in the TLP header, and the thirteenth bit in the TLP header are grouped into at least two groups of fields, a first group of fields in the at least two groups of fields are used to indicate the data type, each group of fields in the at least two groups of fields except the first group of fields indicate different attribute information corresponding to the data type, and the TLP extension header indicates attribute information, corresponding to the data type, other than the attribute information indicated by the at least two groups of fields.

For example, the reserved bit includes the ninth bit or the thirteenth bit in the TLP header, the type field, the Fmt field, and the reserved bit may be grouped into two groups of fields, a first group of fields are used to indicate the data type, a second group of fields indicate attribute information corresponding to the data type, and the TLP extension header indicates attribute information, corresponding to the data type, other than the attribute information indicated by the second group of fields.

For another example, the reserved bit includes the ninth bit and the thirteenth bit in the TLP header, the type field, the Fmt field, the ninth bit in the TLP header, and the thirteenth bit in the TLP header may be grouped into two groups of fields, a first group of fields are used to indicate the data type, a second group of fields indicate attribute information corresponding to the data type, and the TLP extension header indicates attribute information, corresponding to the data type, other than the attribute information indicated by the second group of fields.

In the foregoing design, four fields, namely, the type field, the Fmt field, the ninth bit in the TLP header, and the thirteenth bit in the TLP header may be randomly combined into two or three groups of fields, and each group of fields indicate different information, so that the information required to transmit the data can be indicated in a first TLP. In this way, any two endpoints in the PCIe system can communicate with each other without using the root, so that complexity of the intra-vehicle network can be reduced.

In a possible design, a value of the type field and/or a value of the Fmt field are/is reserved values/a reserved value.

In this design, the reserved value of the type field and/or the reserved value of the Fmt field are/is used, so that the PCIe system can be compatible with a conventional data transmission method in the PCIe system and the data transmission method provided in this embodiment of this disclosure.

In a possible design, the TLP header further includes a first field, and the first field indicates attribute information, corresponding to the data type, other than the at least one piece of attribute information.

In this design, the first TLP can indicate more attribute information.

In a possible design, the first field is a byte 4 to a byte 15 or a byte 4 to a byte 11 of the TLP header.

In this design, the first field may be used in a TLP header whose length is 16 bytes or a TLP header whose length is 12 bytes, to indicate some or all attribute information of the data type.

In a possible design, the first field further includes an identifier of the third node.

In this design, the second node that receives the first TLP may determine a routing path based on the identifier of the third node, so that the TLP can be accurately sent to a destination-end node by using the determined routing path without using the root.

In a possible design, the data type includes any one or more of an image, audio, control-type information, SWRITE, and security.

In a possible design, attribute information corresponding to the image may include an image data type, pixel bit-quantization depth, resolution, and segment indication information.

In a possible design, attribute information corresponding to the audio may include a sampling quantization format, sampling frequency, quantization depth, and a channel quantity/a quantity of channels.

In a possible design, attribute information corresponding to the control-type information may include a control-type information type and an amount of control information of each type.

In a possible design, attribute information corresponding to the security may include a message type, a format indication, and encrypted or not.

In a possible design, attribute information corresponding to SWRITE may include an alignment manner.

According to a fourth aspect, this disclosure provides a PCIe-based data transmission apparatus. The apparatus may be a communication device, or may be a chip or a chip set in the communication device. The communication device may be a first node, a second node, or a third node. The apparatus may include a processing unit and a communication unit. When the apparatus is a communication device, the processing unit may be a processor, the communication unit may be a transceiver, the apparatus may further include a storage module, and the storage module may be a memory. The storage module is configured to store instructions, and the processing unit executes the instructions stored in the storage module, so that the first node performs a corresponding function in the first aspect; or the processing unit executes the instructions stored in the storage module, so that the second node performs a corresponding function in the second aspect; or the processing unit executes the instructions stored in the storage module, so that the third node performs a corresponding function in the third aspect. When the apparatus is a chip or a chip set in the communication device, the processing unit may be a processor, and the communication unit may be an input/output interface, a pin, a circuit, or the like. The processing unit executes instructions stored in a storage module, so that the first node performs a corresponding function in the first aspect; or the processing unit executes instructions stored in a storage module, so that the second node performs a corresponding function in the second aspect; or the processing unit executes instructions stored in a storage module, so that the third node performs a corresponding function in the third aspect. The storage module may be a storage module (for example, a register or a cache) in the chip or the chip set, or may be a storage module (for example, a read-only memory (ROM) or a random-access memory (RAM)) that is in a network device and that is located outside the chip or the chip set.

According to a fifth aspect, a PCIe-based data transmission apparatus is provided, and includes a processor, and may further include a communications interface and/or a memory. The communications interface is configured to transmit information, a message, and/or data between the apparatus and another apparatus. The memory is configured to store computer-executable instructions. When the apparatus runs, the processor executes the computer-executable instructions stored in the memory, so that the apparatus performs the method in the first aspect or any design of the first aspect, the second aspect or any design of the second aspect, or the third aspect or any design of the third aspect.

According to a sixth aspect, this disclosure further provides a computer-readable storage medium, and the computer-readable storage medium stores instructions. When the instructions are run on a computer, the computer is enabled to perform the method in the first aspect or any design of the first aspect, the second aspect or any design of the second aspect, or the third aspect or any design of the third aspect.

According to a seventh aspect, this disclosure further provides a computer program product including instructions, and when the computer program product runs on a computer, the computer is enabled to perform the method in the first aspect or any design of the first aspect, the second aspect or any design of the second aspect, or the third aspect or any design of the third aspect.

According to an eighth aspect, this disclosure further provides a PCIe system, and the system includes a first node, a second node, and a third node. The first node may perform a corresponding function in the first aspect, the second node may perform a corresponding function in the second aspect, and the third node may perform a corresponding function in the third aspect.

According to a ninth aspect, an embodiment of this disclosure provides a chip, and the chip includes at least one processor and a communications interface. The processor is coupled to a memory, and is configured to read a computer program stored in the memory, to perform the method in the first aspect or any design of the first aspect, the second aspect or any design of the second aspect, or the third aspect or any design of the third aspect of embodiments of this disclosure.

According to a tenth aspect, an embodiment of this disclosure provides a chip, and the chip includes a communications interface and at least one processor. The processor runs to perform the method in the first aspect or any design of the first aspect, the second aspect or any design of the second aspect, or the third aspect or any design of the third aspect of embodiments of this disclosure.

It should be noted that in embodiments of this disclosure, "coupling" means that two components are directly or indirectly connected to each other.

BRIEF DESCRIPTION OF DRAWINGS

FIG. 3A is a schematic diagram of a structure of a TLP according to an embodiment of this disclosure;

FIG. 3B is a schematic diagram of a structure of another TLP according to an embodiment of this disclosure;

DESCRIPTION OF EMBODIMENTS

The following describes technical solutions in embodiments of this disclosure with reference to the accompanying drawings in embodiments of this disclosure.

Figure 1:
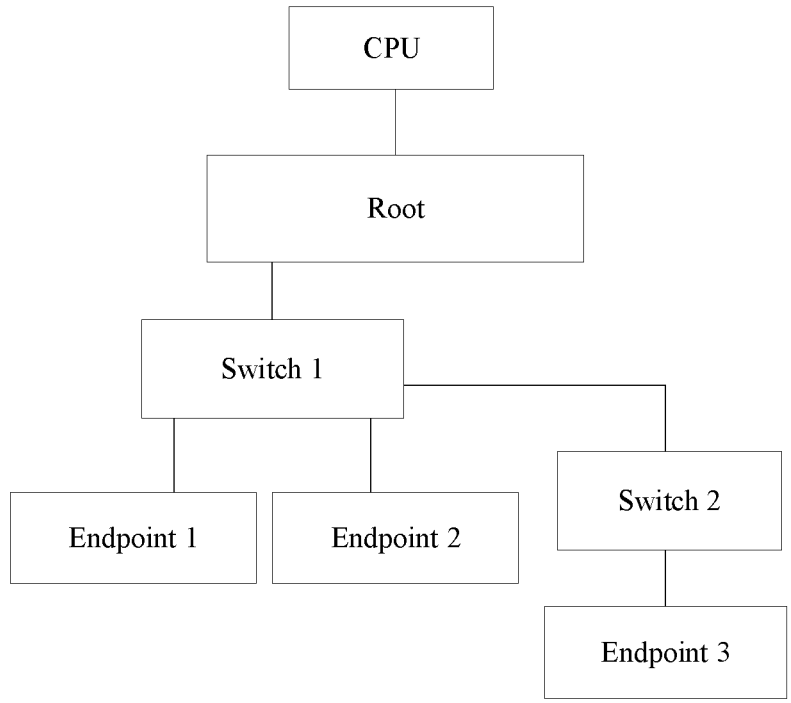
FIG. 1 is a schematic diagram of an architecture of a PCIe system according to an embodiment of this disclosure.

FIG. 1 is a schematic diagram of an architecture of a PCIe system according to an embodiment of this disclosure. As shown in FIG. 1, main component units of the PCIe system include a root complex (or a root), a switch, and an endpoint. The root is responsible for managing all buses (a thick black row in FIG. 1) and all nodes in the system, the root is a bridge used by a central processing unit (CPU) to communicate with another device in the system, the CPU does not belong to the PCIe system, an interface between the CPU and the root complex in the PCIe system is not a PCIe interface, and the root needs to be used when the CPU communicates with each device in the PCIe system. As a data forwarding node, the switch may be used as a bridge for connecting devices such as the root, another switch, and the endpoint. As an endpoint such as a peripheral, the endpoint may send or receive data.

Figure 2:
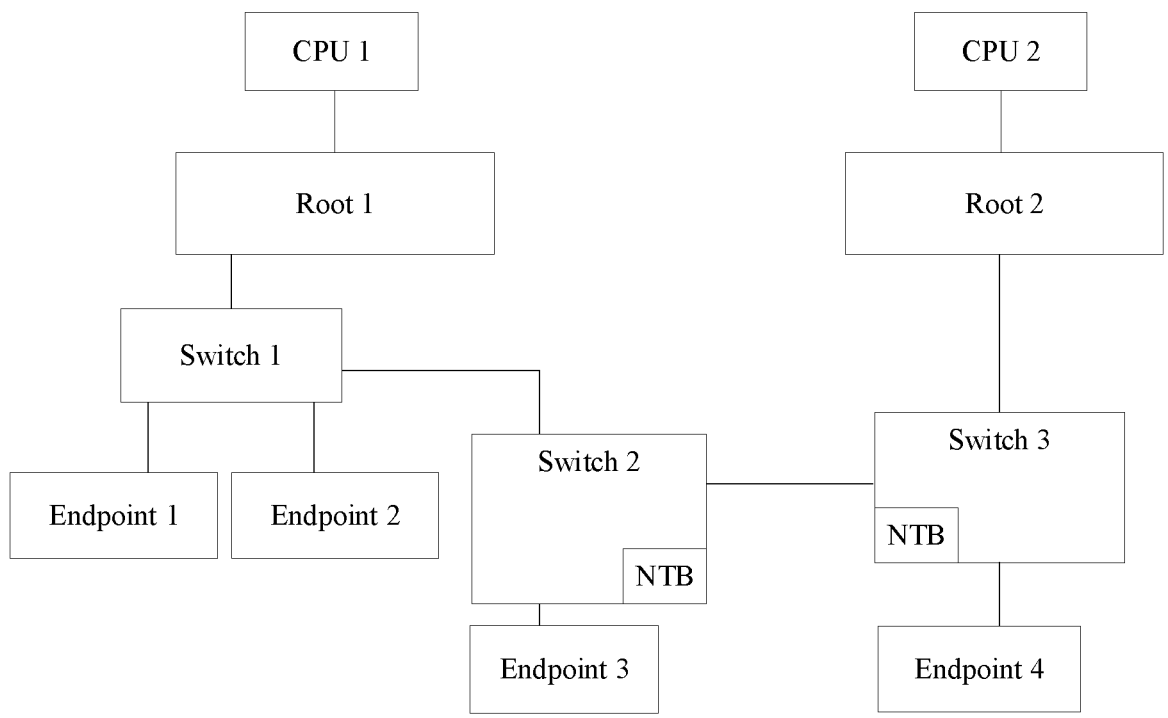
FIG. 2 is a schematic diagram of an architecture of another PCIe system according to an embodiment of this disclosure.

FIG. 2 is a schematic diagram of an architecture of another PCIe system according to an embodiment of this disclosure. In two PCIe systems shown in FIG. 2, nodes in each PCIe system are independently managed by respective roots. As shown in FIG. 2, a root 1 and a root 2 belong to two PCIe systems, the root 1 manages nodes such as a switch 1, an endpoint 1, an endpoint 2, a switch 2, and an endpoint 3, and the root 2 manages nodes such as a switch 3 and an endpoint 4. Because the two PCIe systems have independently allocated addresses and identifiers (IDs), addresses and IDs of devices in different PCIe systems may conflict with each other. To enable a connection and normal communication between the two PCIe systems, bridge conversion needs to be performed between the two systems. For example, the two PCIe systems are connected by using a switch with a non-transparent bridge (NTB), and the NTB converts an address or an ID, so that the two PCIe systems can communicate with each other.

In the PCIe system, endpoints cannot directly communicate with each other without using the root because only the root knows a specific function of each endpoint and a specific type of data that is transmitted, but any two endpoints do not know each other's functions or a specific service type of data that is transmitted. A function of the endpoint in the PCIe system, such as information such as a supported data type and a supported format, is stored in configuration space of the endpoint, and only the root has a right to read the configuration space of the endpoint, and another endpoint or the switch has no right to read the configuration space of the endpoint. Therefore, only the root knows information about a data type and a format that are supported by the endpoint, and another node cannot obtain the information about the data type and the format. The endpoint in the PCIe system does not know a data type and a format that are supported by another endpoint. Therefore, communication cannot be performed without the root.

For example, in FIG. 1, an endpoint 1 and an endpoint 2 are connected to a same switch 1, but the endpoint 1 and the endpoint 2 cannot directly communicate with each other by using the switch 1. For example, the endpoint 1 sends a packet to the endpoint 2. The endpoint 1 needs to first send the packet to the root by using the switch 1, and the root determines, based on a data type supported by each endpoint, that the packet needs to be sent to the endpoint 2, and then the root sends the packet to the endpoint 2 by using the switch 1. For another example, in FIG. 1, the endpoint 1 and the endpoint 3 are separately connected to different switches, but the endpoint 1 and the endpoint 3 also need to communicate with each other by using the root.

Due to such a mechanism in which any two endpoints in the PCIe system need to communicate with each other by using the root, many scenarios in an intra-vehicle network are not applicable. For example, an annular intra-vehicle network requires that a sensor is directly connected to a gateway and data of the sensor is switched, forwarded, and transmitted to different computing/display units by using a gateway/switch in the annular network. Such an intra-vehicle network architecture requires that the data of the sensor can be forwarded in any direction by using the gateway/switch to provide communication link redundancy, to ensure security of intra-vehicle communication. Therefore, the annular intra-vehicle network needs to use another interface. In this case, there are a plurality of types of transmission interfaces in the intra-vehicle network, and information exchange between various transmission interfaces requires interface conversion. Conversion between different interfaces leads to a large increase in complexity of the intra-vehicle network, especially in a high-speed communication scenario.

Based on this, embodiments of this disclosure provide a PCIe-based data transmission method and apparatus, to resolve a problem in a conventional technology that there is a plurality of types of transmission interfaces in an intra-vehicle network and complexity of the intra-vehicle network is relatively high due to a mechanism in which any two endpoints communicate with each other by using a root. The method and the apparatus are based on a same technical concept. Because the method and the device have similar problem resolving principles, for implementation of the apparatus and implementation of the method, refer to each other. Repeated parts are not described. Embodiments of this disclosure provide a PCIe-based data transmission method and apparatus. The method and the apparatus may be applied to an intra-vehicle network, particularly an intra-vehicle network of an automatic driving vehicle, and may also be applied to a PCIe system of another device.

To facilitate understanding of embodiments of this disclosure, the following describes a structure of a TLP in a PCIe base specification revision 5.0 version 1.0.

FIG. 3A shows a structure of a TLP. The TLP mainly includes three parts a TLP header, a data payload, and a TLP digest. A length of the TLP header may be 12 or 16 bytes, and the TLP header is used to indicate a PCIe service type. The data payload is a data part, and a length may be 0 to 4 kilobytes (KB). The TLP digest may be cyclic redundancy check (CRC) (end-to-end 32 bit CRC (ECRC)) code, and a length may be 4 bytes. The ECRC is CRC code, and is used to check whether a packet is correctly transmitted. Optionally, as shown in FIG. 3A, the TLP may further include a TLP prefix, and a length of the TLP prefix may be H bytes, where H is a positive integer.

Figure 4:
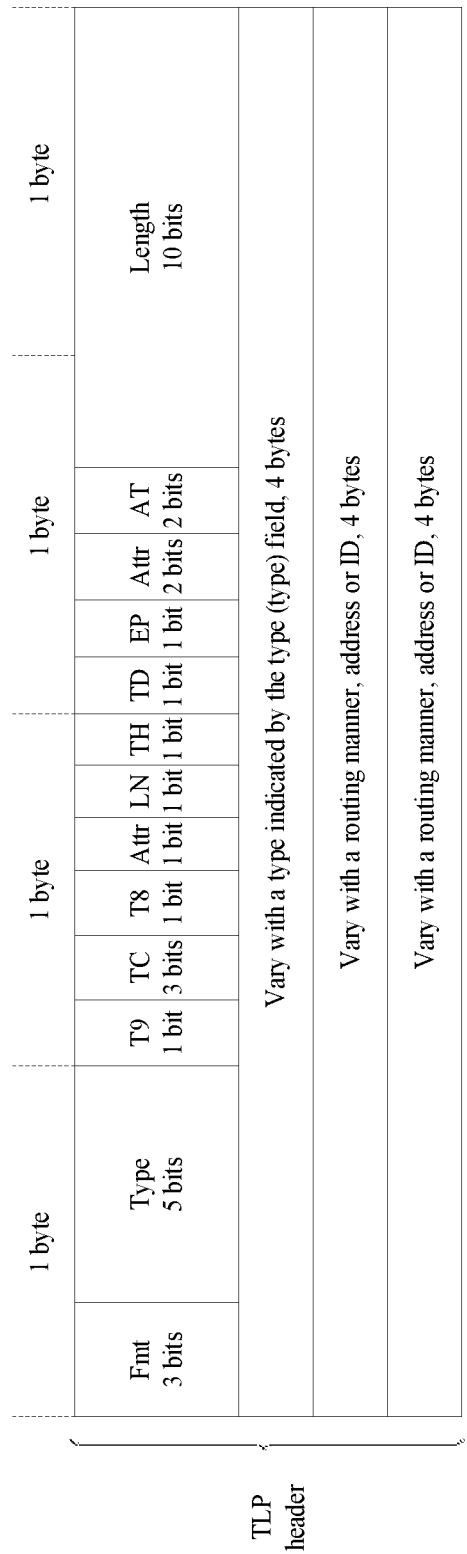
FIG. 4 is a schematic diagram of a structure of a TLP header according to an embodiment of this disclosure.

A TLP header of 16 bytes is used as an example. A structure of the TLP header may be shown in FIG. 4, and mainly includes the following.

Format (Fmt) field: The format field includes 3 bits, and is used to indicate a length of the TLP header and whether the TLP has a data payload part. The TLP header has two lengths. Whether the TLP includes the data payload mainly has two cases: yes and no. Therefore, the Fmt field may indicate four types of information. The length of the TLP header is a first length, and the TLP includes the data payload; the length of the TLP header is the first length, and the TLP does not include the data payload; the length of the TLP header is a second length, and the TLP includes the data payload; and the length of the TLP header is the second length, and the TLP does not include the data payload, where the first length is 12 bytes, and the second length is 16 bytes. In addition, the Fmt field may further indicate a TLP prefix.

The Fmt field includes 3 bits, and there may be a total of eight state values. Five state values in the eight state values may be used to indicate the foregoing five types of information, and the remaining three state values are reserved values. For example, five state values 000, 001, 010, 011, and 100 may be used to indicate the foregoing five types of information, and remaining three state values 101, 110, and 111 are reserved values.

Type field: The type field includes 5 bits, and is used to indicate a service type of the TLP. The service type includes six categories: memory read/write, input/output (I/O) read/write, configuration read/write, a message request, completion, and an atomic operation. The type field includes 5 bits, and has a total of 32 state values. In the PCI Express Base Specification Revision 5.0 Version 1.0, 19 state values are used to indicate the service type of the TLP, and remaining 13 state values are reserved values. For example, 00000, 00001, 00010, 00100, 00101, 11011, 10000 to 10111, 01010, 01011, 01100, 01101, and 01110 may be used to indicate the service type of the TLP, and remaining 13 state values 00011, 00110, 00111, 01000, 01001, 01111, 11000 to 11010, and 11100 to 11111 are reserved values.

T9/T8: T9/T8 is a reserved bit, where T0 is a ninth bit in the TLP header, and T8 is a thirteenth bit in the TLP header.

Traffic class (TC) field: The TC field is used to indicate a scheduling priority.

Attribute (Attr) field: The attribute field is used to indicate a TLP attribute, and the TLP attribute may be a processing type such as ordering or hardware coherency management (snoop).

Lightweight notification (LN) field: The lightweight notification field is a lightweight indication and a simple read/write manner defined in PCIe.

TLP processing hint (TH) field: The TLP processing hint field is used to indicate whether there is a processing hints (PH) at a TLP header tail.

TLP digest indication (indicates presence of TLP Digest (TD)) field: The TLP digest indication field is used to indicate whether a TLP tail includes a TLP digest.

Poisoned data (EP): The poisoned data is used to indicate whether data is poisoned data.

Address type (AT): The address type is used to indicate whether an address needs to be translated.

Length: The length is used to indicate a length of the data payload, and may use 4 bytes as a minimum unit.

Byte 4 to Byte 7: Based on a definition of the service type, that is, based on a service type indicated by the type field, the byte 4 to the byte 7 may indicate content corresponding to the service type.

Byte 8 to Byte 15: An address or an ID is filled based on different routing manners and different content. An address of a destination node or an ID of a destination node may be filled in a byte 8 to a byte 11, and an address of a source node or an ID of a source node may be filled in a byte 12 to a byte 15. Alternatively, an address of a source node or an ID of a source node may be filled in a byte 8 to a byte 11, and an address of a destination node or an ID of a destination node may be filled in a byte 12 to a byte 15.

It may be understood that a structure of a TLP header of 12 bytes is similar to a structure of the TLP header of 16 bytes in terms of types, and a difference lies in that the TLP header of 16 bytes corresponds to a 64-bit address, and the TLP header of 12 bytes corresponds to a 32-bit address.

The method provided in this embodiment of this disclosure is based on a conventional TLP structure disclosed in the PCI Express Base Specification Revision 5.0 Version 1.0. A difference between structures of the first TLP and the second TLP in embodiments of this disclosure and a structure of a conventional TLP disclosed in the PCI Express Base Specification Revision 5.0 Version 1.0 lies in the following. Based on the structure of the conventional TLP, a TLP extension header is further included between a TLP header and a data payload in the structures of the first TLP and the second TLP. As shown in FIG. 3B, a length of the data payload is 0 to N bytes, and N is a positive integer. It should be noted that lengths of the first TLP and the second TLP are the same as a length of the conventional TLP, and the TLP extension header occupies only a length of a data payload part in the conventional TLP. The first TLP is used as an example. A sum of a length of the TLP extension header and a length of the data payload in the first TLP is the same as a length (4K bytes) of the data payload in the conventional TLP. The length of the TLP extension header is not limited, and is theoretically less than 4096 bytes. The "reserved value" in embodiments of this disclosure may be a state value that is not used in the PCI Express Base Specification Revision 5.0 Version 1.0. For example, three state values 101, 110, and 111 of the Fmt field may also be referred to as "reserved values". The "reserved bit" in embodiments of this disclosure may be a bit that is of the TLP and that is not used in the PCI Express Base Specification Revision 5.0 Version 1.0, for example, T8/T9 of the TLP header.

It may be understood that in a subsequent evolved version, the "reserved value" in embodiments of this disclosure may alternatively be a bit that is of the TLP and that is not used in a corresponding evolved version. This is not limited in embodiments of this disclosure.

It should be understood that, in embodiments of this disclosure, "at least one" means one or more, and "a plurality of" means two or more. In addition, "and/or" describes an association relationship between associated objects, and represents that three relationships may exist. For example, A and/or B may represent the following cases: only A exists, both A and B exist, and only B exists, where A and B may be singular or plural. A character "/" generally indicates an "or" relationship between the associated objects, and "at least one of the following items (pieces)" or a similar expression thereof indicates any combination of these items, including a single item (piece) or any combination of a plurality of items (pieces). For example, at least one of a, b, or c may represent a, b, c, a and b, a and c, b and c, or a, b, and c, where a, b, and c may be singular or plural.

In addition, unless otherwise specified, in the descriptions of this disclosure, an ordinal word such as "first" or "second" is used to distinguish a plurality of objects, and cannot be understood as an indication or an implication of relative importance of the plurality of objects, and cannot be understood as an indication or an implication of a sequence, a priority, or the like.

The following describes in detail embodiments of this disclosure with reference to the accompanying drawings.

Figure 5:
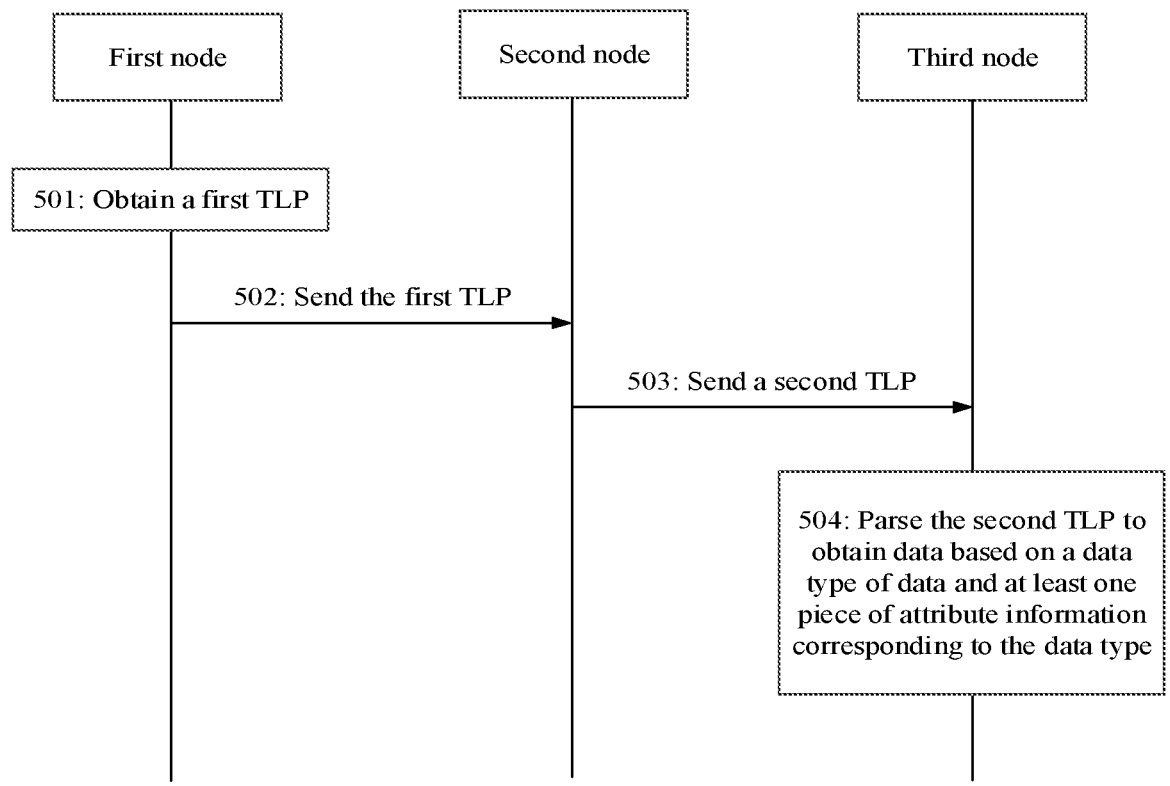
FIG. 5 is a flowchart of a PCIe-based data transmission method according to an embodiment of this disclosure.

FIG. 5 is a flowchart of a PCIe-based data transmission method according to this disclosure. The method may be applied to a PCIe system, for example, a PCIe system shown in FIG. 1 or a PCIe system shown in FIG. 2. As shown in FIG. 5, the method includes the following steps.

Step 501: A first node obtains a TLP, where the TLP includes a TLP header, a TLP extension header, and data, the TLP header includes a type field, a Fmt field, and a reserved bit, and the type field, the Fmt field, the reserved bit, and the TLP extension header are used to indicate a data type of the data and at least one piece of attribute information corresponding to the data type. The data may be carried in a data payload part of the TLP.

The first node may be an endpoint in the PCIe system, or may be a switch in the PCIe system.

Figure 6:
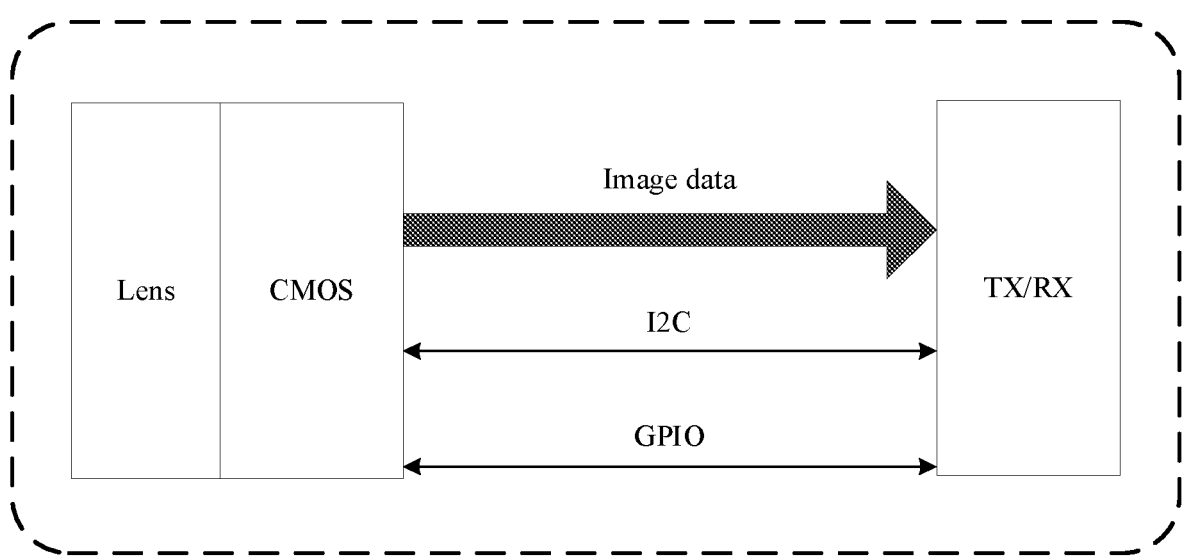
FIG. 6 is a schematic diagram of a structure of a camera according to an embodiment of this disclosure.

In this embodiment of this disclosure, the first node may be an endpoint or a chip. For example, the first node may be a transceiver unit (TX/RX) in the endpoint. A camera is used as an example. A structure of the camera may be shown in FIG. 6, and includes a lens, a photosensitive element (complementary metal oxide semiconductor (COMS)), a transceiver unit (TX/RX), and the like. The COMS is configured to collect image data by using the lens, and send the image data by using the TX in the transceiver unit. The first node may be a camera, or may be a transceiver unit in the camera. If the first node is an endpoint, data encapsulated by the first node may be data collected by the first node. For example, if the first node is a camera, the encapsulated data may be image data collected by the camera; and if the first node is a microphone, the encapsulated data may be audio data collected by the microphone. If the first node is a transceiver unit in the endpoint, data encapsulated by the first node may be data collected by a sensor chip in the endpoint. FIG. 6 is used as an example. The data encapsulated by the first node may be image data collected by the COMS.

In step 501, the data type may include but is not limited to the following several types: an image, audio, control-type information, SWRITE, security, and the like. The data type in the first TLP may be any one of the foregoing data types or a combination of a plurality of data types.

For example, the data type is an image, and the attribute information corresponding to the data type may include but is not limited to the following four types: an image data type: RAW, red, green, and blue (RGB), luma, chroma blue projection, and chroma red projection (YUV), embedded data, and the like; pixel bit-quantization depth: for example, 12, 20, or 24; resolution: for example, 1080P, 2K, or 4K; and segment indication information: an image sensor outputs one row of images at a time. For a TLP of an image with high resolution, one row of images cannot be transmitted at a time, and one row of images needs to be divided into several TLPs for transmission. The segment indication information is used to indicate a specific segment of a current row of a current TLP.

For another example, the data type is audio, and the attribute information corresponding to the data type may include but is not limited to the following four types: a sampling quantization format: for example, floating point quantization or integer quantization; sampling frequency: for example, 24 kilohertz (KHz) or 48 KHz; quantization depth: for example, 8 bits or 12 bits for each sample; and a quantity of sound channels/a quantity of channels used to indicate that a specific quantity of sound channels/channels included in data of a current packet.

For still another example, the data type is control-type information, and the attribute information corresponding to the data type may include but is not limited to the following two types: a control-type information type: for example, an Inter-Integrated Circuit (I2C), general-purpose input/output (GPIO), and a serial peripheral interface (SPI); and an amount of control information of each type for example, a current packet includes three I2Cs and eight GPIOs.

For yet another example, the data type is security, and the attribute information corresponding to the data type may include but is not limited to the following three types: a message type: interaction of a plurality of messages is required to establish security, and types of interaction messages are different, such as an authentication message or an encryption message; a format indication: a grouping manner for bits in a message, and a meaning represented by each group; and encrypted or not: whether a current packet is encrypted.

For a further example, the data type is SWRITE, and the attribute information corresponding to the data type may include but is not limited to the following type: an alignment manner: 4 bytes are used as a minimum unit for alignment, or 8 bytes are used as a minimum unit for alignment.

The foregoing data type is merely an example for description, and in specific implementation, is not limited to the data types listed in embodiments of this disclosure. Attribute information corresponding to each data type is merely an example description. In specific implementation, each data type may alternatively correspond to other attribute information. This is not limited herein.

It may be understood that, in this embodiment of this disclosure, the "data type" is merely an example name, and may alternatively be named another name in specific implementation, for example, may be referred to as a data service type. The "attribute information" is merely an example name, and may alternatively be named another name in specific implementation, for example, may be referred to as an attribute.

In a manner of implementing step 501, the first node may first obtain the data type of the data and the attribute information corresponding to the data type, and then encapsulate the data based on the data type and the attribute information corresponding to the data type, to obtain the first TLP.

For example, the first node is the camera in FIG. 6. The first node may determine an image data type (such as RGB or YUV), pixel quantization depth, image resolution, and the like of collected image data, and may calculate a data volume of each row of an image based on the image data type, the pixel quantization depth, the image resolution, and the like. With reference to a maximum volume of data carried by each first TLP, a quantity of first TLPs required to transmit each row of the image may be obtained, to determine a segmentation manner of the image, so that the segment indication information may be determined based on the segmentation manner.

For example, the first node is the transceiver unit (TX/RX) in the camera in FIG. 6. The first node may receive image data collected by the COMS, and the image data displays attribute information such as an image data type, pixel quantization depth, image resolution, and the like. The first node may calculate a data volume of each row of an image based on the image data type, the pixel quantization depth, the resolution, and the like. With reference to a maximum volume of data carried by each first TLP in PCIe, a quantity of first TLPs required to transmit each row of the image may be obtained, to determine a segmentation manner of the image, so that the segment indication information may be determined based on the segmentation manner.

In a possible implementation, a value of the type field and/or a value of the Fmt field are/is reserved values/a reserved value. The type field and the Fmt field may indicate different information in the first TLP, or may be jointly coded to indicate same information in the first TLP.

For example, the type field and the Fmt field separately indicate different information in the first TLP. For example, the type field indicates the data type, and the Fmt field indicates first attribute information of the data type. Values of the type field and the Fmt field are described.

For example, a value of the type field is a reserved value, and a value of the Fmt field is all state values. In other words, the reserved value of the type field may be used to indicate the data type, and all the state values of the Fmt field may be used to indicate the first attribute information. For example, 13 reserved values such as 00011, 00110, 00111, 01000, 01001, 01111, 11000 to 11010, and 11100 to 11111 of the type field are used to indicate the data type, and a total of eight state values 000 to 111 of the Fmt field are used to indicate the first attribute information.

For another example, a value of the type field is all state values, and a value of the Fmt field is a reserved value. In other words, all the state values of the type field may be used to indicate the data type, and the reserved value of the Fmt field may be used to indicate the first attribute information. For example, a total of 32 state values 00000 to 11111 of the type field are used to indicate the data type, and three reserved values such as 101, 110, and 111 of the Fmt field are used to indicate the first attribute information.

For still another example, a value of the type field is a reserved value, and a value of the Fmt field is a reserved value. In other words, the reserved value of the type field may be used to indicate the data type, and the reserved value of the Fmt field may be used to indicate the first attribute information. For example, 13 reserved values such as 00011, 00110, 00111, 01000, 01001, 01111, 11000 to 11010, and 11100 to 11111 of the type field are used to indicate the data type, and three reserved values such as 101, 110, and 111 of the Fmt field are used to indicate the first attribute information.

In this embodiment of this disclosure, the type field, the Fmt field, the reserved bit, and the TLP extension header are used to indicate the data type of the data and the at least one piece of attribute information corresponding to the data type. There is a plurality of possible implementations, and the plurality of possible implementations are separately described below.

Implementation 1: The type field, the Fmt field, the reserved bit, and the TLP extension header separately indicate different information.

Figure 7:
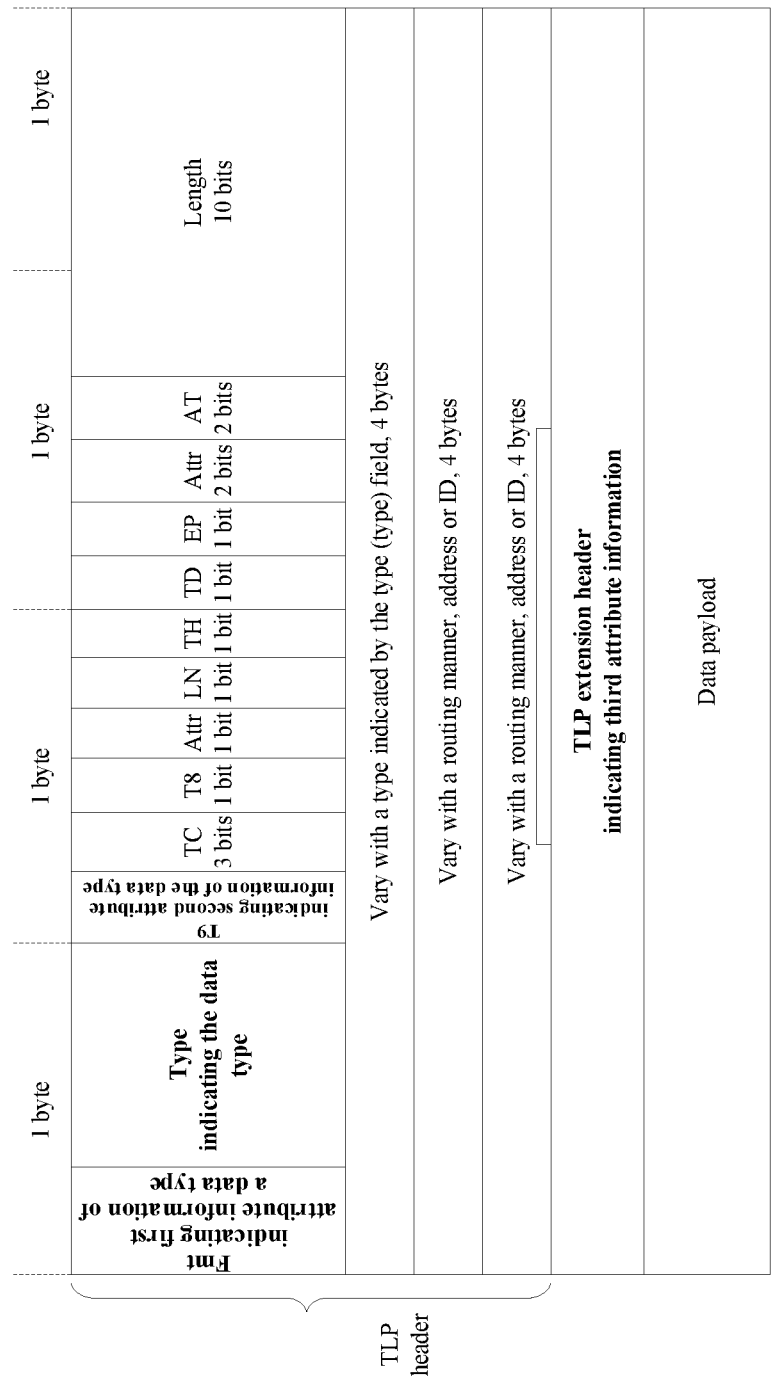
FIG. 7 is a schematic diagram of information carried by a TLP according to an embodiment of this disclosure.

In some embodiments, the type field indicates the data type, and the Fmt field, the reserved bit, and the TLP extension header separately indicate different attribute information of the data type. For example, attribute information corresponding to the data type carried in the first TLP includes first attribute information, second attribute information, and third attribute information. The Fmt field indicates the first attribute information of the data type, the reserved bit indicates the second attribute information of the data type, and the TLP extension header indicates the third attribute information of the data type, as shown in FIG. 7. The reserved bit may be one bit, that is, the ninth bit in the TLP header or the thirteenth bit in the TLP header, or may be two bits, that is, the ninth bit and the thirteenth bit in the TLP header.

For example, the data type is an image, the first attribute information is an image data type, the second attribute information is encryption, and the third attribute information is pixel quantization depth, graphic resolution, segment indication information, or the like.

Figure 8:
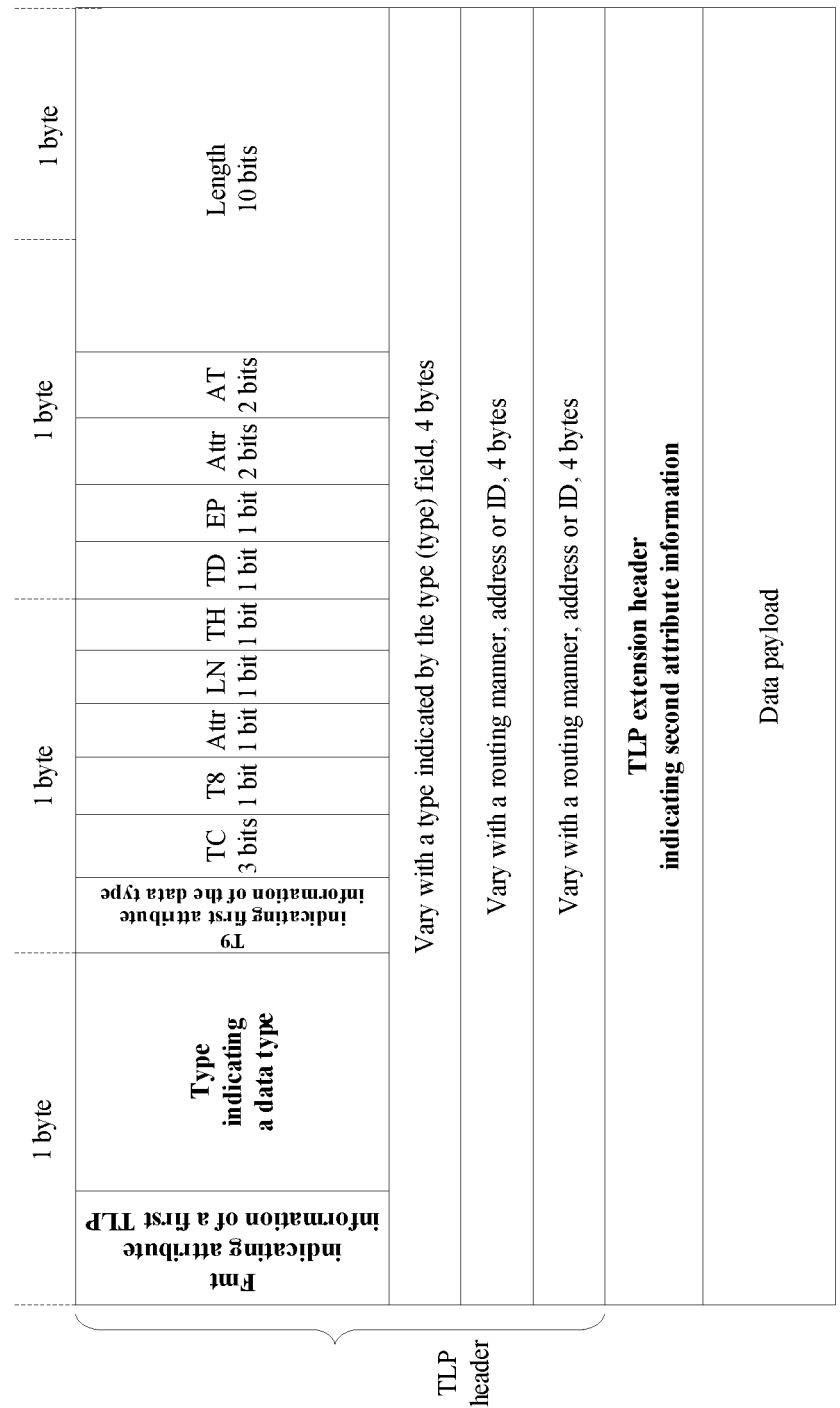
FIG. 8 is a schematic diagram of information carried by another TLP according to an embodiment of this disclosure.

In some other embodiments, the type field indicates the data type, the Fmt field indicates the attribute information of the first TLP, and the reserved bit and the TLP extension header separately indicate different attribute information of the data type. For example, the attribute information corresponding to the data type carried in the first TLP includes the first attribute information and the second attribute information, the reserved bit indicates the first attribute information of the data type, and the TLP extension header indicates the second attribute information of the data type, as shown in FIG. 8. For example, the Fmt field is used to indicate an encapsulation mode of the first TLP. For example, five state values 000, 001, 010, 011, and 100 of the Fmt field are used to indicate that the first TLP is encapsulated in a conventional mode, and three reserved values 101, 110, and 111 of the Fmt field are used to indicate that the first TLP is encapsulated in a mode provided in this disclosure.

Figure 9:
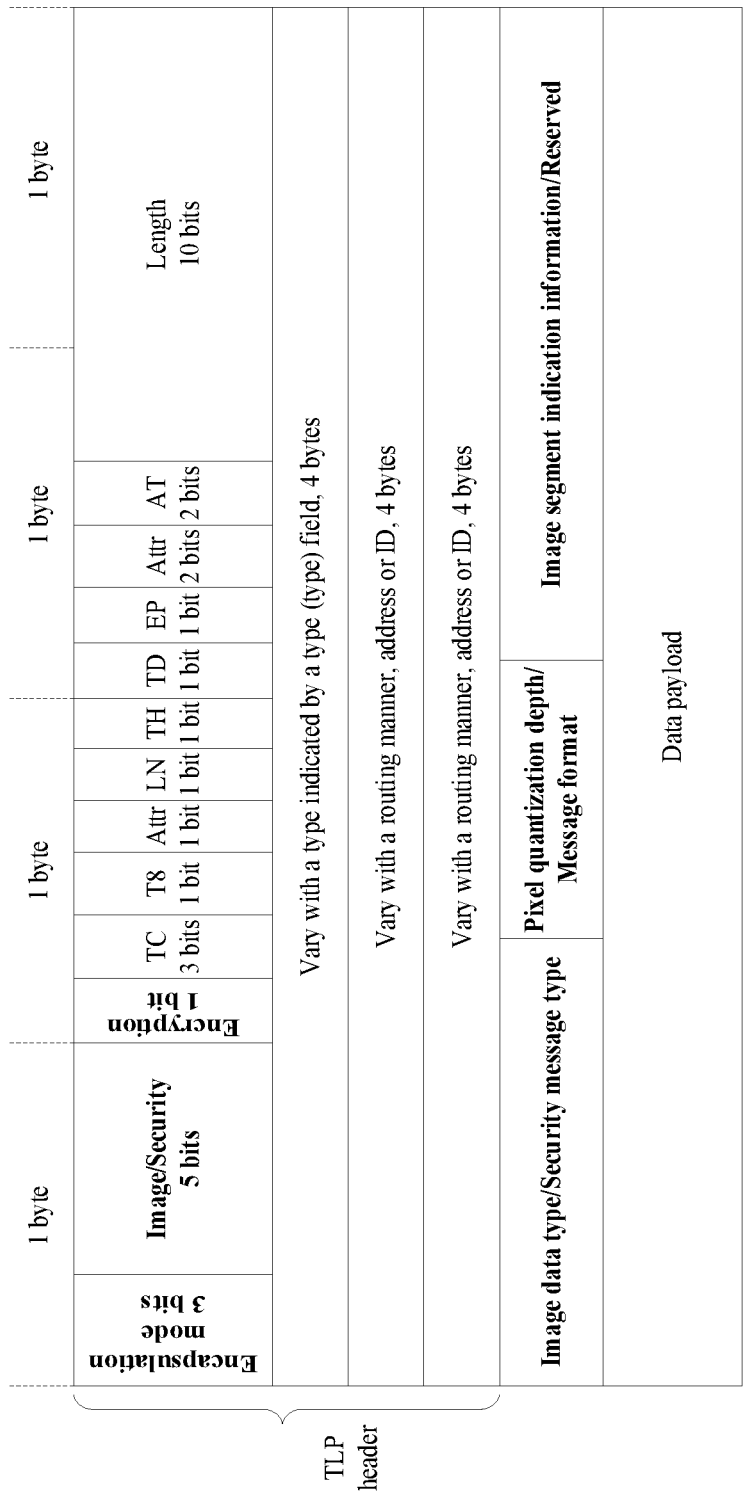
FIG. 9 is a schematic diagram of information carried by another TLP according to an embodiment of this disclosure.

For example, the reserved bit is the ninth bit in the TLP header. As shown in FIG. 9, the Fmt field may indicate an encapsulation mode of the first TLP. For example, 101 is used to indicate that the encapsulation mode is the mode provided in this disclosure, that is, a mode different from a conventional TLP encapsulation mode disclosed in the foregoing PCI Express Base Specification Revision 5.0 Version 1.0. The type field indicates that the data type is an image/security. For example, 00001 indicates that a service is an image, and 00000 indicates a message that is established in an encrypted manner. The reserved bit indicates whether an image service is encrypted. For example, 1 indicates that the image service is encrypted, and 0 indicates that image service is not encrypted. The TLP extension header indicates an image data type/a security information type, pixel quantization depth/a message format, and image segment indication information/reserved.

Implementation 2: The type field, the Fmt field, and the reserved bit are jointly coded to indicate the data type, and the TLP extension header is used to indicate the at least one piece of attribute information corresponding to the data type. The reserved bit may be one bit, that is, a ninth bit in the TLP header or a thirteenth bit in the TLP header, or may be two bits, that is, a ninth bit and a thirteenth bit in the TLP header.

Figure 10:
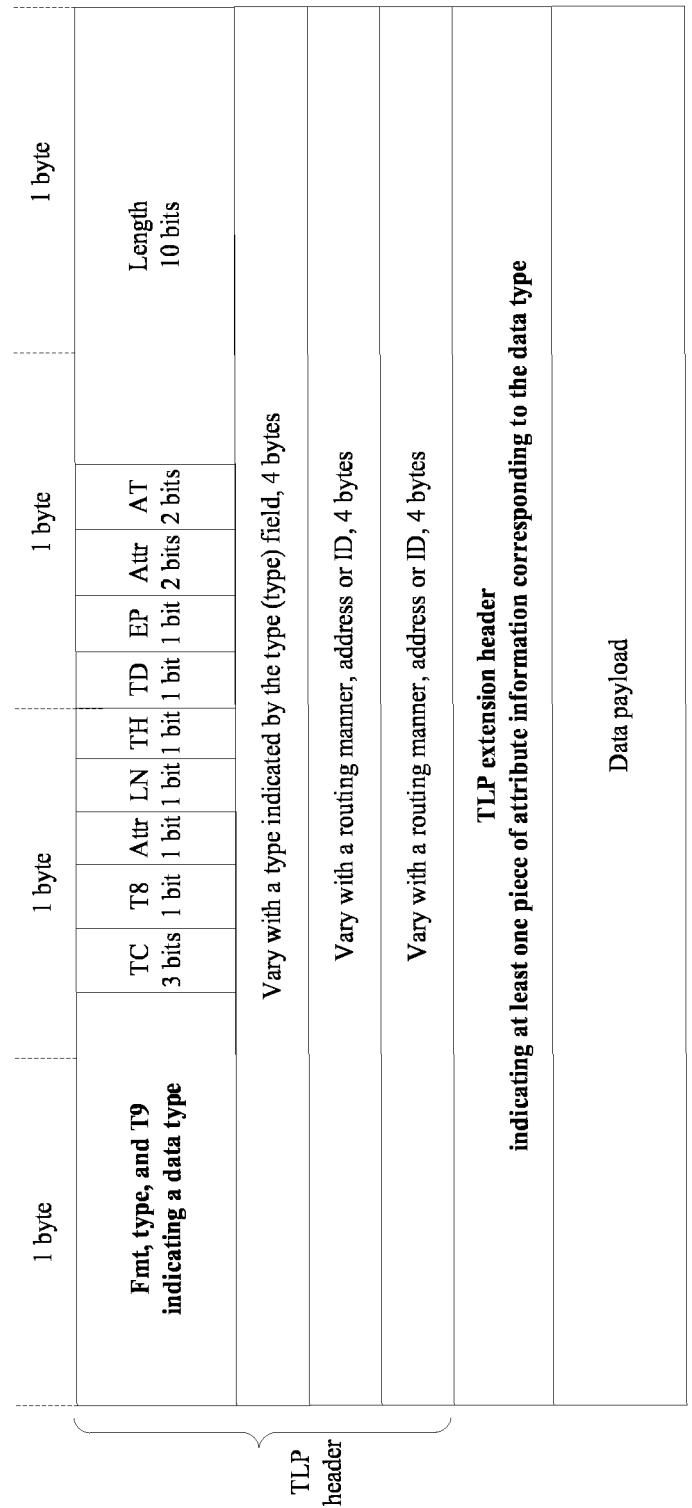
FIG. 10 is a schematic diagram of information carried by another TLP according to an embodiment of this disclosure.

In some embodiments, for example, the reserved bit is the ninth bit in the TLP header. There is a total of nine bits: five bits of the type field, three bits of the Fmt field, and one bit of the reserved bit. The nine bits may be jointly coded (for example, 110000001) to indicate the data type, and the TLP extension header is used to indicate the at least one piece of attribute information corresponding to the data type, as shown in FIG. 10.

Figure 11:
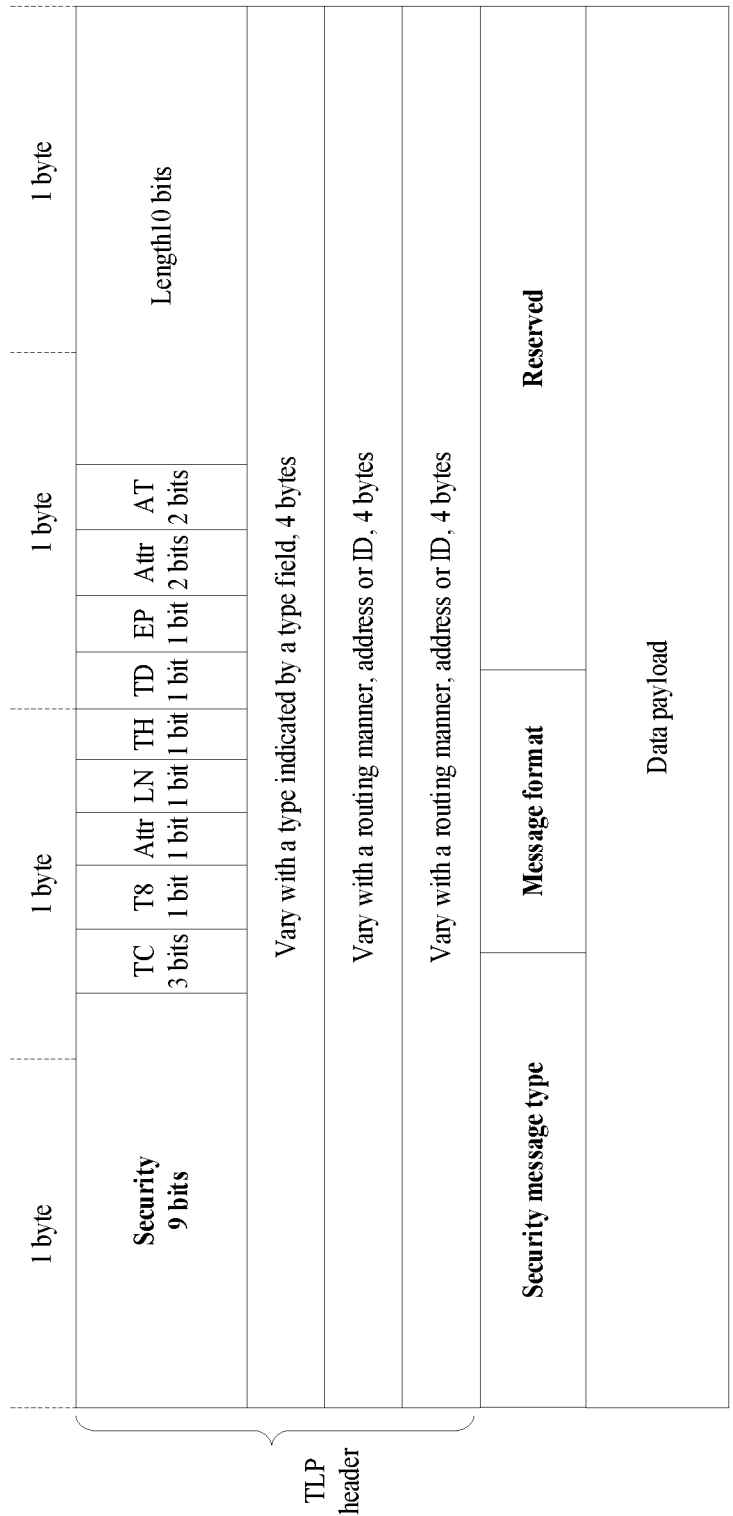
FIG. 11 is a schematic diagram of information carried by another TLP according to an embodiment of this disclosure.

For example, the data type is security. When the Fmt field, the type field, and the reserved bit are jointly coded to indicate a security establishment message, the TLP extension header indicates a type and a format of the message. For example, the reserved bit is the ninth bit in the TLP header. As shown in FIG. 11, a total of nine bits, that is, five bits of the type field, three bits of the Fmt field, and one bit of the reserved bit, may indicate that the data type is security, and security herein includes encryption and interface authentication. The TLP extension header may indicate a security message type, a message format, and the like. It should be noted that, in this embodiment of this disclosure, the TLP uses 4 bytes as a minimum unit, and a bit other than an indication field less than 4 bytes is reserved.

Implementation 3: The reserved bit includes a ninth bit or a thirteenth bit in the TLP header, the type field, the Fmt field, and the reserved bit are grouped into at least two groups of fields, and each group of fields in the at least two groups of fields and the TLP extension header separately indicate different information.

At least one group of fields include at least two fields. In this way, any two fields may be combined to indicate one type of information, and different groups of fields indicate different information. In this case, the type field, the Fmt field, and the ninth bit in the TLP header may be grouped into two groups of fields. If the type field, the Fmt field, and the ninth bit in the TLP header are grouped into three groups of fields, the type field, the Fmt field, and the ninth bit in the TLP header are grouped into one group, that is, the same as the implementation 1. Details are not described herein again.

In some embodiments, a first group of fields in the at least two groups of fields are used to indicate the data type, each group of fields in the at least two groups of fields except the first group of fields indicate different attribute information corresponding to the data type, and the TLP extension header indicates attribute information, corresponding to the data type, other than the attribute information indicated by the at least two groups of fields.

In this embodiment, there may be a plurality of specific grouping manners in which the type field, the Fmt field, and the reserved bit are grouped into at least two groups of fields. For example, the reserved bit includes the ninth bit in the TLP header. Possible grouping manners include the following.

Grouping manner A1: One group is the type field, and another group is the Fmt field and the ninth bit in the TLP header.

Figure 12:
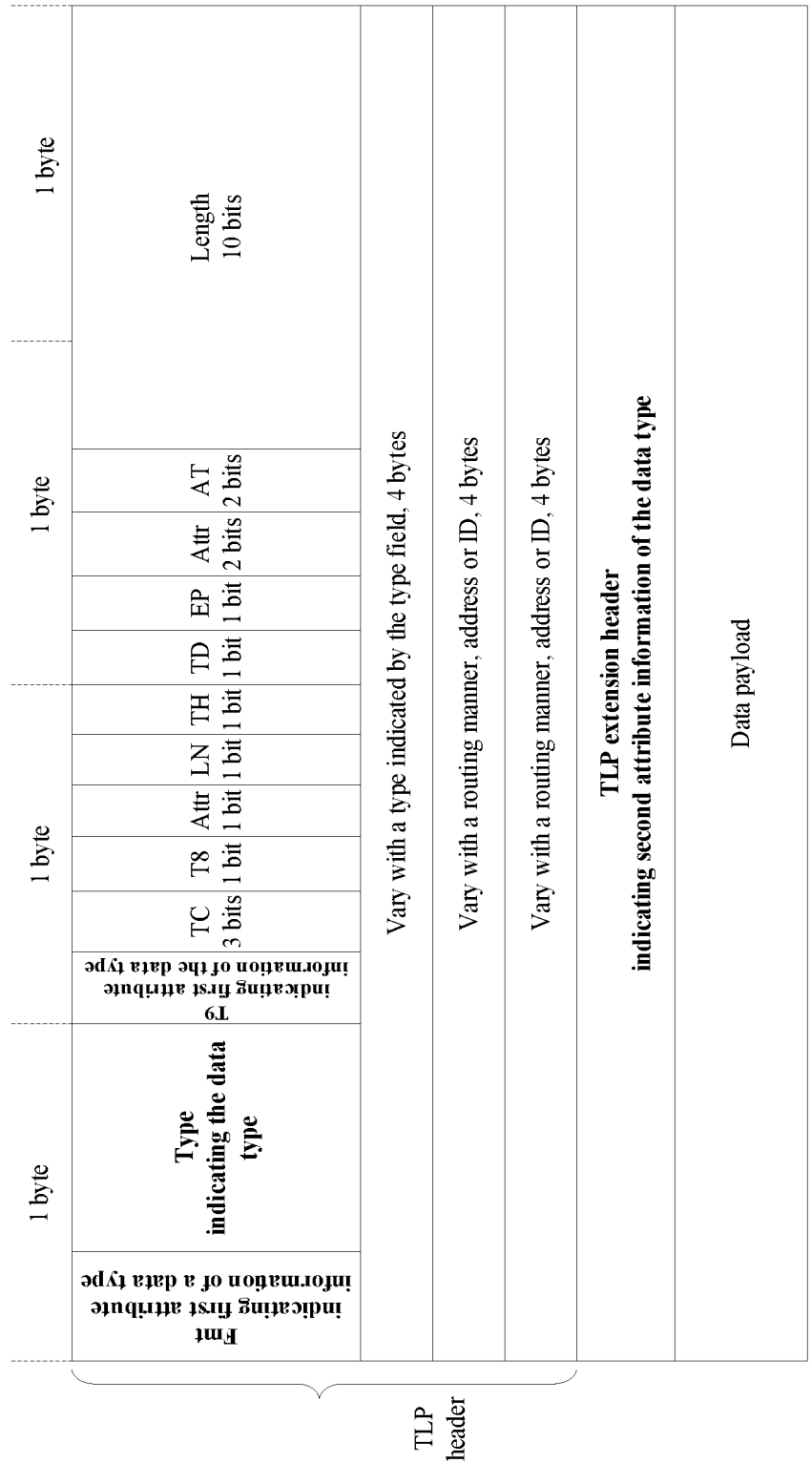
FIG. 12 is a schematic diagram of information carried by another TLP according to an embodiment of this disclosure.

For example, as shown in FIG. 12, the type field may indicate the data type, the Fmt field, and the ninth bit in the TLP header indicates the first attribute information corresponding to the data type, and the TLP extension header indicates the second attribute information of the data type. Certainly, alternatively, the Fmt field and the ninth bit in the TLP header may indicate the data type, and the type field indicates the first attribute information corresponding to the data type. Specific information indicated by each field is not limited herein.

Grouping manner A2: One group is the type field and the Fmt field, and another group is the ninth bit in the TLP header.

Figure 13:
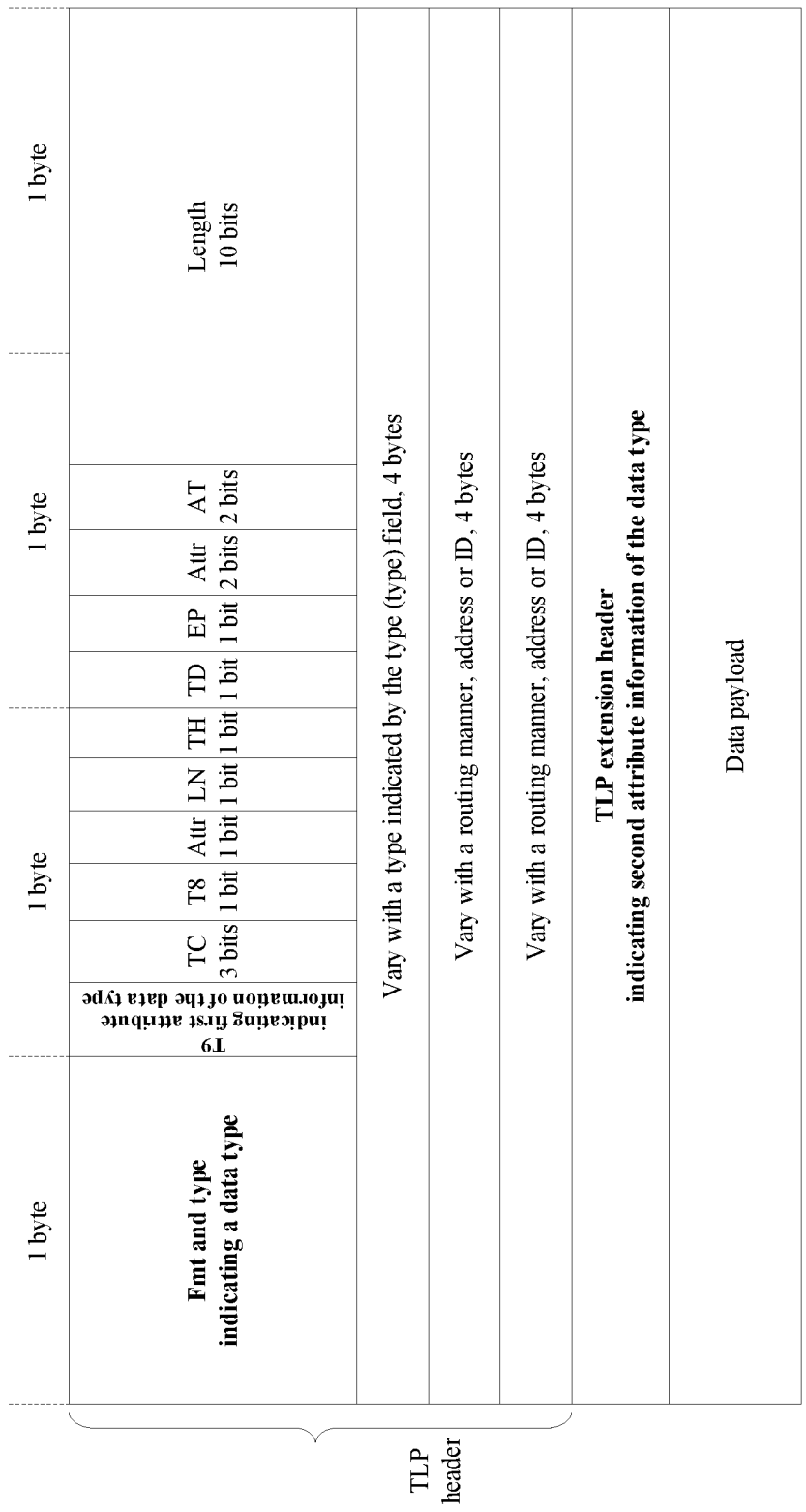
FIG. 13 is a schematic diagram of information carried by another TLP according to an embodiment of this disclosure.

For example, as shown in FIG. 13, the type field and the Fmt field may indicate the data type, the ninth bit in the TLP header indicates the first attribute information corresponding to the data type, and the TLP extension header indicates the second attribute information of the data type. Certainly, alternatively, the ninth bit in the TLP header indicates the data type, and the type field and the Fmt field indicate the first attribute information corresponding to the data type. Specific information indicated by each field is not limited herein.

Grouping manner A3: One group is the type field and the ninth bit in the TLP header, and another group is the Fmt field.

Figure 14:
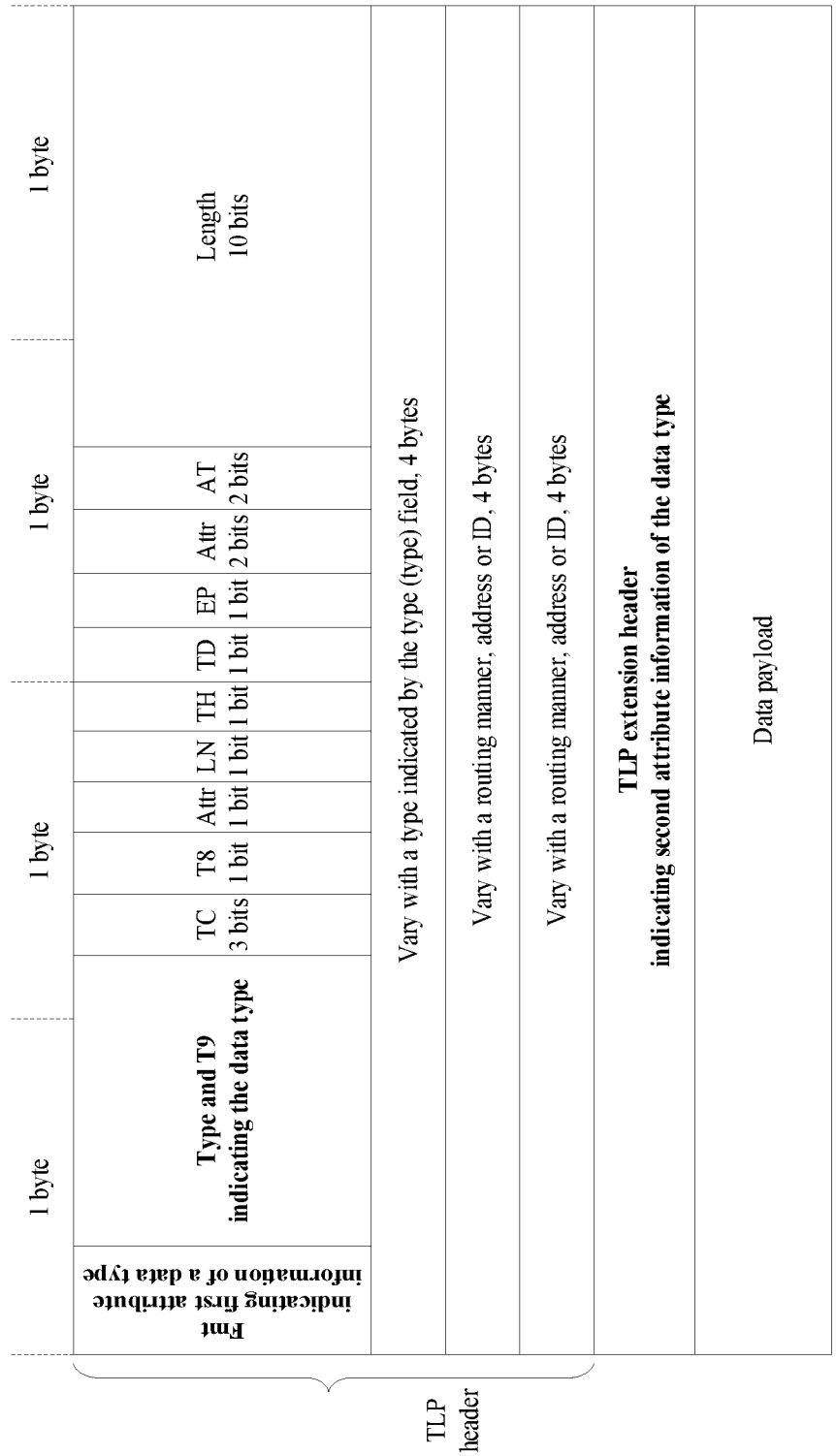
FIG. 14 is a schematic diagram of information carried by another TLP according to an embodiment of this disclosure.

For example, as shown in FIG. 14, the type field and the ninth bit in the TLP header may indicate the data type, the Fmt field indicates the first attribute information corresponding to the data type, and the TLP extension header indicates the second attribute information of the data type. Certainly, alternatively, the Fmt field may indicate the data type, and the type field and the ninth bit in the TLP header indicate the first attribute information corresponding to the data type. Specific information indicated by each field is not limited herein.

In some other embodiments, a first group of fields in the at least two groups of fields are used to indicate the data type, a second group of fields indicate attribute information of the first TLP, and the TLP extension header indicates the attribute information corresponding to the data type. Alternatively, the first group of fields may be used to indicate the data type, the second group of fields indicate the attribute information corresponding to the data type, and the TLP extension header indicates attribute information of the first TLP.

Figure 15:
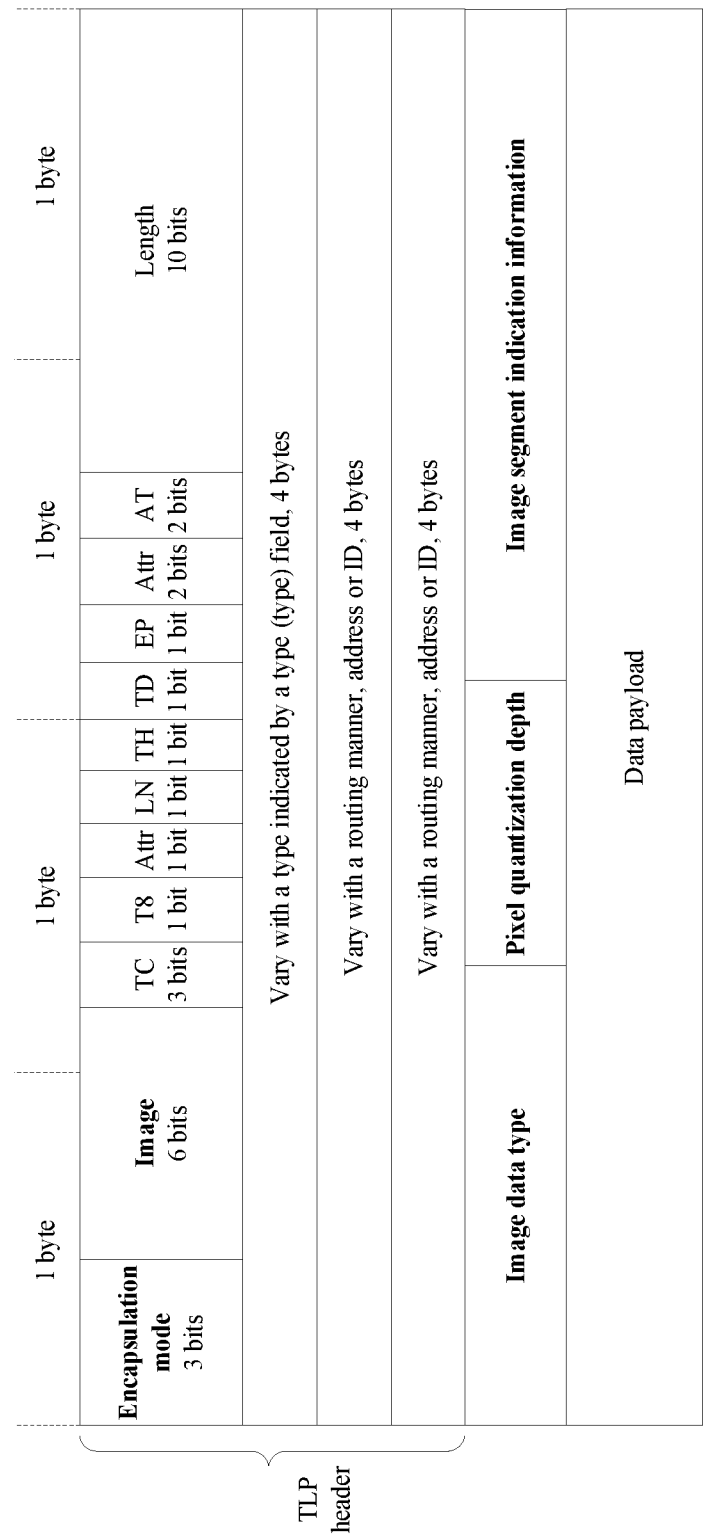
FIG. 15 is a schematic diagram of information carried by another TLP according to an embodiment of this disclosure.

The grouping manner A3 is used as an example. The first group of fields are the Fmt field, and indicate the attribute information of the first TLP; and in the second group of fields, the type field and the ninth bit in the TLP header are jointly coded to indicate the data type, and the TLP extension header indicates the attribute information corresponding to the data type. For example, as shown in FIG. 15, the Fmt field may indicate an encapsulation mode of the first TLP. For example, 101 is used to indicate that the encapsulation mode is the mode provided in this disclosure, that is, a mode different from a conventional TLP encapsulation mode disclosed in the foregoing PCI Express Base Specification Revision 5.0 Version 1.0. The type field and the ninth bit in the TLP header are jointly coded to indicate that the data type is an image, for example, 000001 indicates that a service is an image; and the TLP extension header indicates an image data type, pixel quantization depth, and image segmentation indication information.

Implementation 4: The reserved bit includes the ninth bit and the thirteenth bit in the TLP header, the type field, the Fmt field, the ninth bit in the TLP header, and the thirteenth bit in the TLP header are grouped into at least two groups of fields, and each group of fields in the at least two groups of fields and the TLP extension header separately indicate different information.

In some embodiments, a first group of fields in the at least two groups of fields are used to indicate the data type, each group of fields in the at least two groups of fields except the first group of fields indicate different attribute information corresponding to the data type, and the TLP extension header indicates attribute information, corresponding to the data type, other than the attribute information indicated by the at least two groups of fields.

In this embodiment, there may be a plurality of specific grouping manners in which the type field, the Fmt field, and the ninth bit and the thirteenth bit in the TLP header are grouped into the at least two groups of fields. In one manner, the type field, the Fmt field, the ninth bit in the TLP header, and the thirteenth bit in the TLP header may be grouped into two groups of fields, for example, a first group of fields and a second group of fields. Possible grouping manners include the following.

Grouping manner B1: The first group of fields include one field, the second group of fields include three fields, and there is a total of four grouping manners.

For example, the first group of fields are the Fmt field, and the second group of fields are the type field, the ninth bit in the TLP header, and the thirteenth bit in the TLP header. For another example, the first group of fields are the type field, and the second group of fields are the Fmt field, the ninth bit in the TLP header, and the thirteenth bit in the TLP header. Details are not listed herein one by one.

Grouping manner B2: The first group of fields include two fields, the second group of fields include two fields other than the first group of fields, and there is a total of six grouping manners.

For example, the first group of fields are the type field and the Fmt field, and the second group of fields are the ninth bit in the TLP header and the thirteenth bit in the TLP header. For another example, the first group of fields are the Fmt field and the ninth bit in the TLP header, and the second group of fields are the type field and the thirteenth bit in the TLP header. Details are not listed herein one by one.

Based on the grouping manner B1 and the grouping manner B2, in some embodiments, the first group of fields may be used to indicate the data type, the second group of fields may be used to indicate the attribute information corresponding to the data type, and the TLP extension header indicates attribute information, corresponding to the data type, other than the attribute information indicated by the second group of fields.

In some other embodiments, the first group of fields are used to indicate the data type, the second group of fields indicate attribute information of the first TLP, and the TLP extension header indicates the attribute information corresponding to the data type. Alternatively, the first group of fields may be used to indicate the data type, the second group of fields indicate the attribute information corresponding to the data type, and the TLP extension header indicates attribute information of the first TLP.

Figure 16:
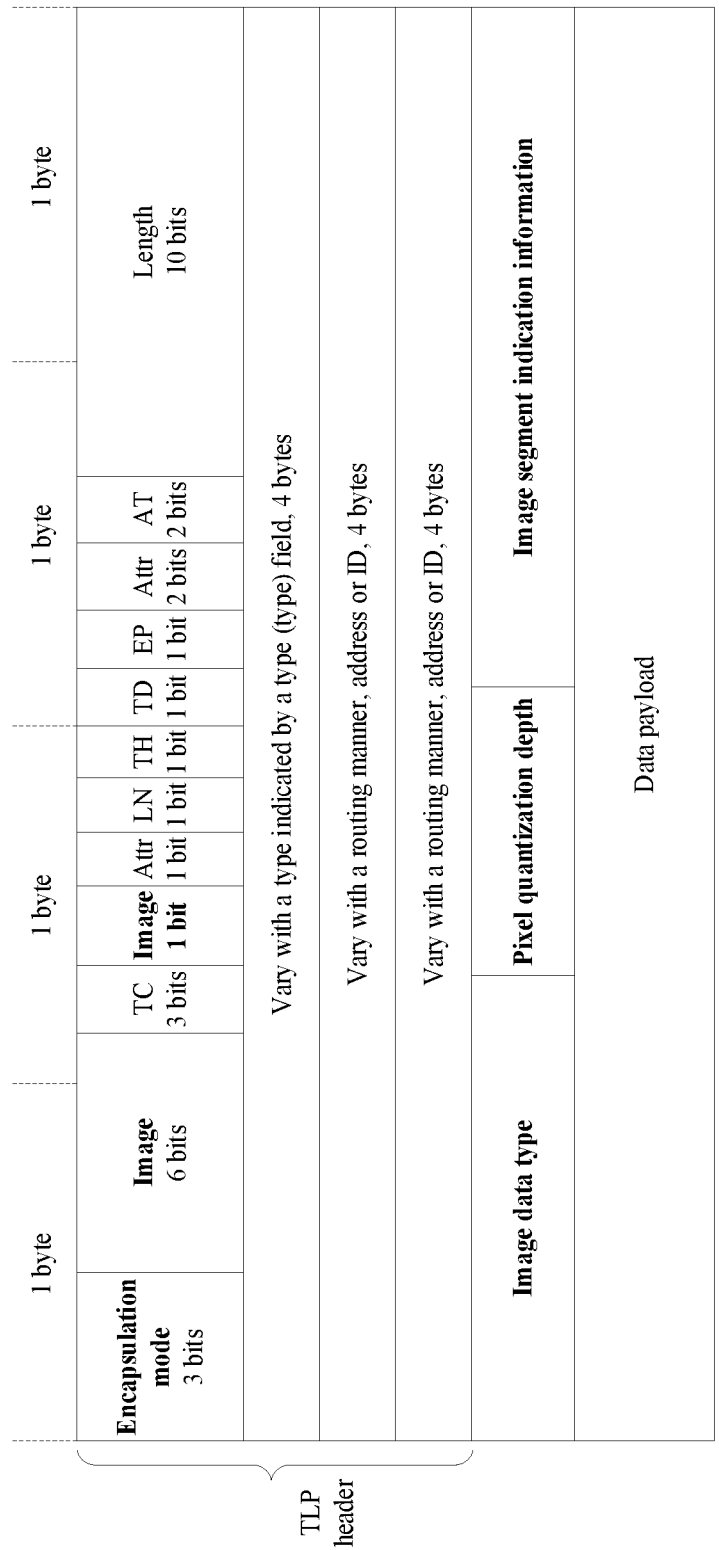
FIG. 16 is a schematic diagram of information carried by another TLP according to an embodiment of this disclosure.

The grouping manner B1 is used as an example. The first group of fields are the type field, the ninth bit in the TLP header, and the thirteenth bit in the TLP header, and the type field, the ninth bit in the TLP header, and the thirteenth bit in the TLP header are jointly coded to indicate the data type; the second group of fields are the Fmt field, and indicate the attribute information of the first TLP; and the TLP extension header indicates the attribute information corresponding to the data type. For example, as shown in FIG. 16, the Fmt field may indicate an encapsulation mode of the first TLP. For example, 101 is used to indicate that the encapsulation mode is the mode provided in this disclosure, that is, a mode different from a conventional TLP encapsulation mode disclosed in the foregoing PCI Express Base Specification Revision 5.0 Version 1.0. The type field and the ninth bit and the thirteenth bit in the TLP header are jointly coded to indicate that the data type is an image, for example, 000001 indicates that a service is an image; and the TLP extension header indicates an image data type, pixel quantization depth, and image segmentation indication information.

In another manner, the type field, the Fmt field, the ninth bit in the TLP header, and the thirteenth bit in the TLP header may be grouped into three groups of fields, for example, a first group of fields, a second group of fields, and a third group of fields. Possible grouping manners include the following.

Grouping manner B3: The first group of fields are the type field, the second group of fields are the Fmt field, and the third group of fields are the ninth bit in the TLP header and the thirteenth bit in the TLP header.

Grouping manner B4: The first group of fields are the type field, the second group of fields are the Fmt field and the ninth bit in the TLP header, and the third group of fields are the thirteenth bit in the TLP header.

Grouping manner B5: The first group of fields are the type field, the second group of fields are the Fmt field and the thirteenth bit in the TLP header, and the third group of fields are the ninth bit in the TLP header.

Grouping manner B6: The first group of fields are the type field and the Fmt field, the second group of fields are the thirteenth bit in the TLP header, and the third group of fields are the ninth bit in the TLP header.

Grouping manner B7: The first group of fields are the type field and the ninth bit in the TLP header, the second group of fields are the Fmt field, and the third group of fields are the thirteenth bit in the TLP header.

Grouping manner B8: The first group of fields are the type field and the thirteenth bit in the TLP header, the second group of fields are the Fmt field, and the third group of fields are the fourteenth bit in the TLP header.

Based on the grouping manner B3 to the grouping manner B8, in some embodiments, the first group of fields may be used to indicate the data type, the second group of fields may be used to indicate the first attribute information corresponding to the data type, the third group of fields may be used to indicate the second attribute information corresponding to the data type, and the TLP extension header indicates attribute information, corresponding to the data type, other than the attribute information indicated by the second group of fields and the third group of fields.

In some other embodiments, the first group of fields are used to indicate the data type, the second group of fields indicate attribute information of the first TLP, the third group of fields may be used to indicate the attribute information corresponding to the data type, and the TLP extension header indicates attribute information, corresponding to the data type, other than the attribute information indicated by the third group of fields. Alternatively, the first group of fields are used to indicate the data type, the second group of fields indicate the attribute information corresponding to the data type, the third field indicates attribute information, corresponding to the data type, other than the attribute information indicated by the second group of fields, and the TLP extension header indicates attribute information of the first TLP.

In some other embodiments, the TLP header may further include a first field. For example, the first field may be a byte 4 to a byte 15 of a TLP header of 16 bytes, or may be a byte 4 to a byte 11 of a TLP header of 12 bytes.

In a possible implementation, the type field, the Fmt field, the reserved bit, and the TLP extension header may be used to indicate the data type of the data and the at least one piece of attribute information corresponding to the data type, and the first field does not carry the attribute information corresponding to the data type. For specific indication manners of the four fields: the type field, the Fmt field, the reserved bit, and the TLP extension header indication, refer to the foregoing implementations 1 to 4. Details are not described herein again.

In another possible implementation, the type field, the Fmt field, the reserved bit, and the TLP extension header may be used to indicate the data type of the data and a part of attribute information corresponding to the data type, and the first field is used to indicate another part of attribute information corresponding to the data type, for example, the type field, the Fmt field, the reserved bit, and the TLP extension header indicate the data type of the data and the at least one piece of attribute information corresponding to the data type, and the first field indicates attribute information, corresponding to the data type, other than the at least one piece of attribute information. For specific indication manners of the four fields: the type field, the Fmt field, the reserved bit, and the TLP extension header indication, refer to the foregoing implementations 1 to 4. Details are not described herein again.

Figure 17:
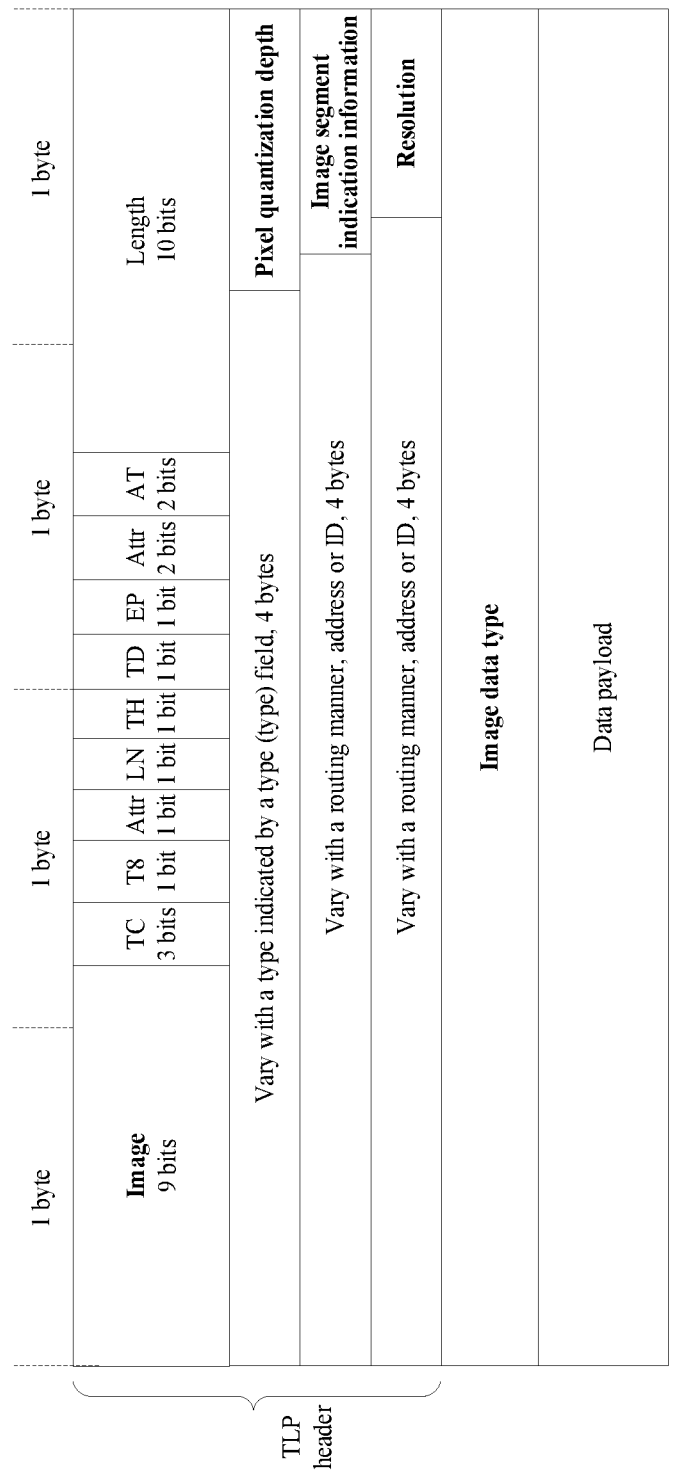
FIG. 17 is a schematic diagram of information carried by another TLP according to an embodiment of this disclosure.

For example, the type field, the Fmt field, and the reserved bit are jointly coded to indicate the data type, and the TLP extension header indicates a part of attribute information corresponding to the data type. For example, the first field is a byte 4 to a byte 15 of a TLP header of 16 bytes. As shown in FIG. 17, the type field, the Fmt field, and the reserved bit are jointly coded to indicate that the data type is an image, the TLP extension header indicates an image data type, and the first field indicates pixel quantization depth, resolution, segment indication information, and the like.

In still another possible implementation, the type field, the Fmt field, the reserved bit, and the TLP extension header may be used to indicate the data type of the data, and the first field is used to indicate the attribute information corresponding to the data type. In other words, the four fields: the type field, the Fmt field, the reserved bit, and the TLP extension header do not carry the attribute information corresponding to the data type, and all the attribute information corresponding to the data type is carried in the first field.

The foregoing implementations may indicate a format of a service in an image, audio, control-type information, SWRITE, and security, may indicate a plurality of formats of a service in an image, audio, control-type information, SWRITE, and security, may indicate a plurality of formats of a plurality of services in an image, audio, control-type information, SWRITE, and security, or may indicate a combination (for example, an image with security protection) of a plurality of services in an image, audio, control-type information, SWRITE, and security. Alternatively, another service type and another format may be indicated. Details are not listed herein one by one.

Based on the foregoing embodiment, the first TLP may further carry identity information of a destination node, that is, an identifier of the third node, and the identifier may be an address or an ID of the third node. For example, the first field may carry the identifier of the third node. The first TLP may further carry identity information of the first node, that is, an identifier of the first node, and the identifier may be an address or an ID of the first node. For example, the first field may carry the identifier of the first node.

The third node may be an endpoint in the PCIe system, or may be a switch in the PCIe system.

Step 502: The first node sends the first TLP to the second node, and accordingly, the second node receives the first TLP from the first node. The second node may be connected to the first node.

The second node may be an endpoint in the PCIe system, or may be a switch in the PCIe system. For example, the second node may be a switch separately connected to the first node and the second node.

Step 503: The second node sends a second TLP to the third node, and accordingly, the third node receives the second TLP from the second node.

In a possible implementation, the first TLP is the same as the second TLP. In other words, after receiving the first TLP from the first node, the second node forwards the first TLP to the third node.

In another possible implementation, the first TLP is different from the second TLP. In other words, after receiving the first TLP from the first node, the second node processes the first TLP, for example, modifies identity information of a source node of the first TLP from the identifier of the first node to an identifier of the second node to obtain the second TLP, and then sends the second TLP to the third node. The second TLP sent by the second node and the first TLP sent by the first node carry same data, a same data type, and same attribute information corresponding to the data type. It should be understood that for related content such as data, a data type, and attribute information corresponding to the data type that are carried in the second TLP, refer to the foregoing related descriptions of the first TLP. Details are not described herein again.

In some embodiments, the first TLP further includes the identifier of the third node. Before step 503, the second node may further determine a routing path based on the identifier of the third node and route information, and then send the second TLP to the third node based on the routing path.

Step 504: The third node obtains the data based on the data type of the data and the at least one piece of attribute information corresponding to the data type.

Further, the third node parses the second TLP to obtain the data.

In a possible implementation, the third node may obtain, from the received second TLP, the data type of the data and the at least one piece of attribute information corresponding to the data type, determine, based on the data type of the data and the at least one piece of attribute information corresponding to the data type, an encapsulation format of a data payload carried in the second TLP, and then decapsulate the data payload in the second TLP to obtain the data.

For example, the third node may determine, based on the Fmt field, the type field, and the reserved bit in the TLP header and the TLP extension header, the data type of the data and the attribute information corresponding to the data type.

For another example, the third node may determine, based on the Fmt field, the type field, and the reserved bit in the TLP header and the TLP extension header, the data type of the data and a part of attribute information corresponding to the data type, and determine, based on the first field in the TLP header, another part of attribute information corresponding to the data type.

For still another example, the third node may determine the data type of the data based on the Fmt field, the type field, and the reserved bit in the TLP header and the TLP extension header, and determine, based on the first field in the TLP header, the attribute information corresponding to the data type.

A data transmission process in the PCIe system is described below with reference to a specific example.

Figure 18:
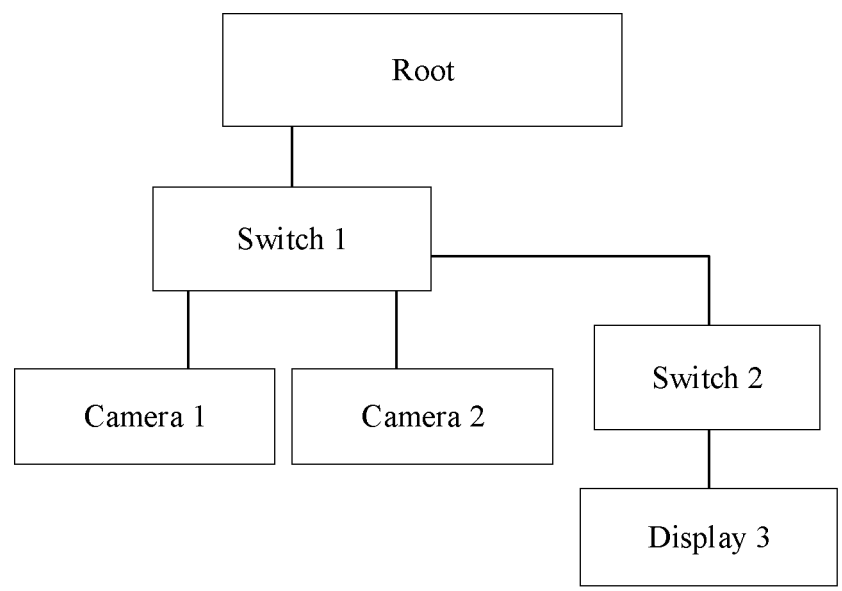
FIG. 18 is a schematic diagram of an architecture of a PCIe system according to an embodiment of this disclosure.

FIG. 18 is a schematic diagram of an architecture of another PCIe system according to an embodiment of this disclosure. As shown in FIG. 18, the PCIe system includes a root complex, a switch 1 connected to the root complex (root), a switch 2 connected to the switch 1, a camera 1, a camera 2, and a display connected to the switch 2. Content photographed by the camera 1 and the camera 2 needs to be displayed on the display. The camera 1/camera 2 may transmit data to the display by using the switch 1 and the switch 2 without using the root. The camera 1/camera 2 may transmit data to the switch 1 by performing the method performed by the first node, the switch 1 may transmit data to the switch 2 by performing the method performed by the second node, and the display may obtain data by performing the data transmission method performed by the third node.

That the camera 1 transmits data to the display is used as an example below for description. A specific data transmission process is as follows Process S1: The camera 1 may calculate a volume of data of each row of an image based on an output image type (such as RGB or YUV), a quantity of quantized bits per pixel, and image resolution (such as 2K or 4K), and determine, with reference to a maximum volume of data carried by each first TLP in PCIe, a quantity of first TLPs required to transmit the volume of data of each row of the image, to determine a segmentation manner of the image.

Process S2: The camera 1 encapsulates collected image data into a first TLP. A plurality of encapsulation manners may be used by the first TLP, and include but are not limited to the following.

Encapsulation manner 1: The camera 1 may use a type field in a TLP header to indicate that a data type is an image, use a Fmt field to indicate an image data type, use a reserved bit (including a ninth bit and/or a thirteenth bit in the TLP header) to indicate encrypted or not, and use a TLP extension header to indicate pixel quantization depth, graphic resolution, segment indication information, and the like; the camera 1 fills the data into a data payload of the first TLP; and the camera 1 fills identity information of the camera 1 (for example, an address/ID of the camera 1) and identity information of the display (for example, an address/ID of the display) into a byte 8 to a byte 15 of the TLP header.

Encapsulation manner 2: The camera 1 may use a type field in a TLP header to indicate that a data type is an image, use a Fmt field to indicate an encapsulation mode of the first TLP, use a reserved bit (including a ninth bit and/or a thirteenth bit in the TLP header) to indicate encrypted or not, and use a TLP extension header to indicate an image data type, pixel quantization depth, graphic resolution, segment indication information, and the like; the camera 1 fills the data into a data payload of the first TLP; and the camera 1 fills identity information of the camera 1 (for example, an address/ID of the camera 1) and identity information of the display (for example, an address/ID of the display) into a byte 8 to a byte 15 of the TLP header.

Encapsulation manner 3: The camera 1 may use state values of nine bits (a reserved bit includes a ninth bit or a thirteenth bit in a TLP header) or ten bits (a reserved bit includes a ninth bit and a thirteenth bit in a TLP header) obtained after jointly coding a type field, a Fmt field, and the reserved bit to indicate that a data type is an image, and use a TLP extension header to indicate an image data type, pixel quantization depth, graphic resolution, segment indication information, and the like; the camera 1 fills the data into a data payload of the first TLP; and the camera 1 fills identity information of the camera 1 (for example, an address/ID of the camera 1) and identity information of the display (for example, an address/ID of the display) into a byte 8 to a byte 15 of the TLP header.

Encapsulation manner 4: The camera 1 may use a state value obtained after jointly coding any two fields in a type field, a Fmt field, and one reserved bit (the reserved bit is a ninth bit or a thirteenth bit in a TLP header) to indicate that a data type is an image, use one remaining field to indicate an image data type, and use a TLP extension header to indicate pixel quantization depth, graphic resolution, segment indication information, and the like; the camera 1 fills the data into a data payload of the first TLP; and the camera 1 fills identity information of the camera 1 (for example, an address/ID of the camera 1) and identity information of the display (for example, an address/ID of the display) into a byte 8 to a byte 15 of the TLP header.

Encapsulation manner 5: The camera 1 may group a total of four fields: a type field, a Fmt field, a ninth bit in a TLP header, and a thirteenth bit in the TLP header into two groups of fields, use one group of fields to indicate that a data type is an image, use the other group of fields to indicate an image data type, and use a TLP extension header to indicate pixel quantization depth, graphic resolution, segment indication information, and the like; the camera 1 fills the data into a data payload of the first TLP; and the camera 1 fills identity information of the camera 1 (for example, an address/ID of the camera 1) and identity information of the display (for example, an address/ID of the display) into a byte 8 to a byte 15 of the TLP header.

Encapsulation manner 6: The camera 1 may group a total of four fields: a type field, a Fmt field, a ninth bit in a TLP header, and a thirteenth bit in the TLP header into three groups of fields, use a first group of fields to indicate that a data type is an image, use a second group of fields to indicate an image data type, use a third group of fields to indicate pixel quantization depth, and use a TLP extension header to indicate graphic resolution, segment indication information, and the like; the camera 1 fills the data into a data payload of the first TLP; and the camera 1 fills identity information of the camera 1 (for example, an address/ID of the camera 1) and identity information of the display (for example, an address/ID of the display) into a byte 8 to a byte 15 of the TLP header.

Encapsulation manner 7: The camera 1 may use a type field in a TLP header to indicate that a data type is an image, use a Fmt field to indicate an image data type, use a reserved bit (including a ninth bit and/or a thirteenth bit in the TLP header) to indicate encrypted or not, use a TLP extension header to indicate pixel quantization depth, and use a byte 4 to a byte 15 of the TLP header to indicate graphic resolution, segment indication information, and the like; the camera 1 fills the data into a data payload of the first TLP; and the camera 1 fills identity information of the camera 1 (for example, an address/ID of the camera 1) and identity information of the display (for example, an address/ID of the display) into a byte 8 to a byte 15 of the TLP header.

Encapsulation manner 8: The camera 1 may use state values of nine bits (a reserved bit includes a ninth bit or a thirteenth bit in a TLP header) or ten bits (a reserved bit includes a ninth bit and a thirteenth bit in a TLP header) obtained after jointly coding a type field, a Fmt field, and the reserved bit to indicate that a data type is an image, use a TLP extension header to indicate an image data type, and use a byte 4 to a byte 15 of the TLP header to indicate pixel quantization depth, graphic resolution, segment indication information, and the like; the camera 1 fills the data into a data payload of the first TLP; and the camera 1 fills identity information of the camera 1 (for example, an address/ID of the camera 1) and identity information of the display (for example, an address/ID of the display) into a byte 8 to a byte 15 of the TLP header.

Encapsulation manner 9: The camera 1 may use a state value obtained after jointly coding any two fields in a type field, a Fmt field, and one reserved bit (the reserved bit is a ninth bit or a thirteenth bit in a TLP header) to indicate that a data type is an image, use one remaining field to indicate an image data type, use a TLP extension header to indicate pixel quantization depth, and use a byte 4 to a byte 15 of the TLP header to indicate graphic resolution, segment indication information, and the like; the camera 1 fills the data into a data payload of the first TLP; and the camera 1 fills identity information of the camera 1 (for example, an address/ID of the camera 1) and identity information of the display (for example, an address/ID of the display) into a byte 8 to a byte 15 of the TLP header.

Encapsulation manner 10: The camera 1 may group a total of four fields: a type field, a Fmt field, a ninth bit in a TLP header, and a thirteenth bit in the TLP header into two groups of fields, use one group of fields to indicate that a data type is an image, use the other group of fields to indicate an image data type, use a TLP extension header to indicate pixel quantization depth, and use a byte 4 to a byte 15 of the TLP header to indicate graphic resolution, segment indication information, and the like; the camera 1 fills the data into a data payload of the first TLP; and the camera 1 fills identity information of the camera 1 (for example, an address/ID of the camera 1) and identity information of the display (for example, an address/ID of the display) into a byte 8 to a byte 15 of the TLP header.

Encapsulation manner 11: The camera 1 may group a total of four fields: a type field, a Fmt field, a ninth bit in a TLP header, and a thirteenth bit in the TLP header into three groups of fields, use a first group of fields to indicate that a data type is an image, use a second group of fields to indicate an image data type, use a third group of fields to indicate pixel quantization depth, use a TLP extension header to indicate graphic resolution, and use a byte 4 to a byte 15 of the TLP header to indicate segment indication information and the like; the camera 1 fills the data into a data payload of the first TLP; and the camera 1 fills identity information of the camera 1 (for example, an address/ID of the camera 1) and identity information of the display (for example, an address/ID of the display) into a byte 8 to a byte 15 of the TLP header.

Encapsulation manner 12: The camera 1 may use a state value obtained after jointly coding a type field, a Fmt field, a reserved bit (including a ninth bit and/or a thirteenth bit in a TLP header), and a TLP extension header to indicate that a data type is an image, and use a byte 4 to a byte 15 of the TLP header to indicate an image data type, pixel quantization depth, graphic resolution, segment indication information, and the like; the camera 1 fills the data into a data payload of the first TLP; and the camera 1 fills identity information of the camera 1 (for example, an address/ID of the camera 1) and identity information of the display (for example, an address/ID of the display) into a byte 8 to a byte 15 of the TLP header.

Process S3: The camera 1 sends the first TLP to the switch 1.

Process S4: After receiving the first TLP, the switch 1 obtains the Fmt field by parsing the TLP header of the first TLP; and if a state value of the Fmt field is a state value used in the PCI Express Base Specification Revision 5.0 Version 1.0, performs processing based on an original PCIe mechanism, that is, forwards the first TLP to the root, and then the root determines a receiving endpoint based on a function of each endpoint, and then sends the first TLP to the receiving endpoint. If the Fmt field is content defined in this embodiment of this disclosure, the switch 1 searches, based on the identity information of the display in the first TLP, for route information stored in the switch 1, encapsulates the data into a second TLP based on the encapsulation manner provided in this embodiment of this disclosure, and sends the second TLP to the switch 2 based on a found routing path.

Process S5: After receiving the first TLP or the second TLP, the switch 2 obtains the Fmt field by parsing the TLP header; and if a state value of the Fmt field is a state value used in the PCI Express Base Specification Revision 5.0 Version 1.0, performs processing based on an original PCIe mechanism, that is, forwards the first TLP to the root, and then the root determines a receiving endpoint based on a function of each endpoint, and then sends the first TLP to the receiving endpoint. If the Fmt field is content defined in this embodiment of this disclosure, the switch 2 searches, based on identity information of the display in the second TLP, for route information stored in the switch 2, and sends the second TLP to the display based on a found routing path.

Process S6: After receiving the first TLP or the second TLP, the display obtains a type and a format that are of the image from the TLP header and the TLP extension header, recovers a complete image based on the segment indication information, and transmits the data to a display screen for display.

Herein, a specific implementation in which the display obtains the type and the format that are of the image from the TLP header and the TLP extension header is related to an encapsulation manner of the received first TLP or the received second TLP. For ease of understanding, only a few examples are listed.

For example, the first TLP encapsulates the data in the encapsulation manner 1 in the process S2. The display learns, by parsing the type field, that the data type is an image, and obtains the image data type, encrypted or not, an indication of the pixel quantization depth, the graphic resolution, the segment indication information, and the like by separately parsing the Fmt field, the reserved bit (including the ninth bit and/or the thirteenth bit in the TLP header), and the TLP extension header.

For another example, the first TLP encapsulates the data in the encapsulation manner 3 in the process S2. The display learns, by parsing the state values of a total of nine bits (the reserved bit includes the ninth bit or the thirteenth bit in the TLP header) or ten bits (the reserved bit includes the ninth bit and the thirteenth bit in the TLP header): the type field, the Fmt field, and the reserved bit, that the data type is an image, and obtains the image data type, the pixel quantization depth, the graphic resolution, the segment indication information, and the like by parsing the TLP extension header.

For still another example, the first TLP encapsulates the data in the encapsulation manner 7 in the process S2. The display learns, by parsing the type field, that the data type is an image, obtains the image data type by parsing the Fmt field, obtains, by parsing the reserved bit (including the ninth bit and/or the thirteenth bit in the TLP header), an indication of encrypted or not, obtains the pixel quantization depth by parsing the TLP extension header, and obtains the graphic resolution, the segment indication information, and the like by parsing the byte 4 to the byte 15 the TLP header.

For yet another example, the first TLP encapsulates the data in the encapsulation manner 8 in the process S2. The display learns, by parsing the state values of the nine bits (the reserved bit includes the ninth bit or the thirteenth bit in the TLP header) or the ten bits (the reserved bit includes the ninth bit and the thirteenth bit in the TLP header) obtained after jointly coding the type field, the Fmt field, and the reserved bit, that the data type is an image, obtains the image data type by parsing the TLP extension header, and obtains the pixel quantization depth, the graphic resolution, the segment indication information, and the like by parsing the byte 4 to the byte 15 of the TLP header.

For a further example, the first TLP encapsulates the data in the encapsulation manner 12 in the process S2. The display learns, by parsing the state value obtained after jointly coding the type field, the Fmt field, the reserved bit (including the ninth bit and/or the thirteenth bit in the TLP header), and the TLP extension header, that the data type is an image, and obtains the image data type, the pixel quantization depth, the resolution, the segment indication information, and the like by parsing the byte 4 to the byte 15 of the TLP header.

In this embodiment of this disclosure, information, such as the data type of the data and the at least one piece of attribute information corresponding to the data type, required by transmission with another endpoint is indicated by using the type field, the Fmt field, and the reserved bit in the TLP header and the TLP extension header. In this way, any two endpoints in a PCIe system can communicate with each other without using the root, so that complexity of an intra-vehicle network can be reduced.

In the foregoing examples, the reserved value of the Fmt field and/or the reserved value of the type field are/is used, so that the encapsulation mode of the TLP can be explicitly or implicitly indicated. In this way, the PCIe system can be compatible with a conventional data transmission method in the PCIe system and the data transmission method provided in this embodiment of this disclosure.

The solutions provided in embodiments of this disclosure are described in the foregoing embodiments mainly from a perspective of interaction between the first node, the second node, and the third node. It may be understood that, to implement the foregoing functions, the first node, the second node, and the third node may include corresponding hardware structures and/or software modules for performing the functions. A person skilled in the art should be easily aware that, in combination with examples of units and algorithm steps described in embodiments disclosed in this specification, embodiments of this disclosure can be implemented by using hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this disclosure.

In embodiments of this disclosure, the first node, the second node, and the third node may be divided into function modules based on the foregoing method examples. For example, each function module corresponding to each function may be obtained through division, or two or more functions may be integrated into one unit. The integrated unit may be implemented in a form of hardware, or may be implemented in a form of a software function unit.

Figure 19:
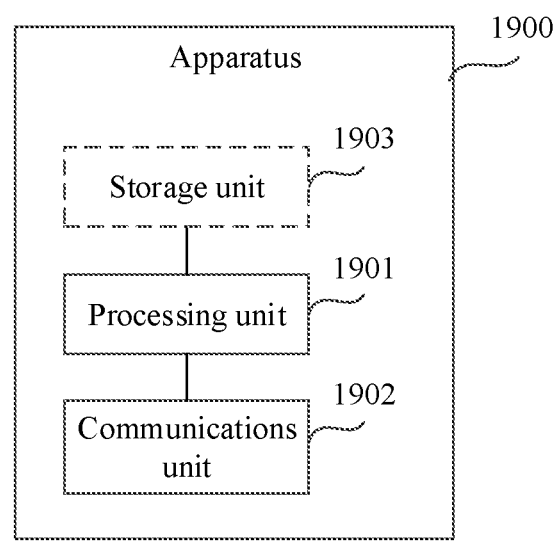
FIG. 19 is a schematic diagram of a structure of a data transmission apparatus according to an embodiment of this disclosure.

When an integrated unit is used, FIG. 19 is a schematic diagram of a structure of a PCIe-based data transmission apparatus according to an embodiment of this disclosure. As shown in FIG. 19, an apparatus 1900 may include a processing unit 1901 and a communication unit 1902. The processing unit 1901 is configured to control and manage an action of the apparatus 1900. The communication unit 1902 is configured to support communication between the apparatus 1900 and another device. Optionally, the communication unit 1902 may also be referred to as a transceiver unit, and may include a receiving unit and/or a sending unit, and the receiving unit and the sending unit are respectively configured to perform a receiving operation and a sending operation. The apparatus 1900 may further include a storage unit 1903, configured to store program code and/or data of the apparatus 1900.

The apparatus 1900 may be the first node (or a chip or a chip set disposed in the first node or a part that is of the chip and that is configured to perform a function in a related method) in any one of the foregoing embodiments, and the first node may be connected to a second node by using a PCIe bus. The processing unit 1901 may support the apparatus 1900 in executing an action of the first node in the foregoing method examples, or the processing unit 1901 mainly executes an internal action of the first node in the method examples. The communication unit 1902 may support communication between the apparatus 1900 and the second node.

In an embodiment, the processing unit 1901 is configured to obtain a TLP, where the TLP includes a TLP header, a TLP extension header, and data, the TLP header includes a type field, an Fmt field, and a reserved bit, and the type field, the Fmt field, the reserved bit, and the TLP extension header are used to indicate a data type of the data and at least one piece of attribute information corresponding to the data type. The communication unit 1902 is configured to send the TLP to the second node.

In a possible design, the type field indicates the data type, the Fmt field indicates first attribute information of the data type, the reserved bit indicates second attribute information of the data type, and the TLP extension header indicates third attribute information of the data type.

In a possible design, the type field, the Fmt field, and the reserved bit are jointly coded to indicate the data type, and the TLP extension header is used to indicate the at least one piece of attribute information corresponding to the data type.

In a possible design, the reserved bit includes a ninth bit and/or a thirteenth bit in the TLP header.

In a possible design, the reserved bit includes a ninth bit and/or a thirteenth bit in the TLP header, the type field, the Fmt field, the ninth bit in the TLP header, and the thirteenth bit in the TLP header are grouped into at least two groups of fields, a first group of fields in the at least two groups of fields are used to indicate the data type, each group of fields in the at least two groups of fields except the first group of fields indicate different attribute information corresponding to the data type, and the TLP extension header indicates attribute information, corresponding to the data type, other than the attribute information indicated by the at least two groups of fields.

In a possible design, a value of the type field and/or a value of the Fmt field are/is reserved values/a reserved value.

In a possible design, the TLP header further includes a first field, and the first field indicates attribute information, corresponding to the data type, other than the at least one piece of attribute information.

In a possible design, the first field is a byte 4 to a byte 15 or a byte 4 to a byte 11 of the TLP header.

In a possible design, the first field further includes an identifier of a third node.

In a possible design, the data type includes any one or more of an image, audio, control-type information, SWRITE, and security.

The apparatus 1900 may be the second node (or a chip or a chip set disposed in the second node or a part that is of the chip and that is configured to perform a function in a related method) in any one of the foregoing embodiments. The processing unit 1901 may support the apparatus 1900 in executing an action of the second node in the foregoing method examples, or the processing unit 1901 mainly executes an internal action of the second node in the method examples. The communication unit 1902 may support communication between the apparatus 1900 and another node (for example, a first node, a third node, or another second node).

In an embodiment, the communication unit 1902 may include a first communication unit and a second communication unit.

The first communication unit is configured to receive a first TLP from the first node. The second communication unit is configured to send a second TLP to the third node, where a TLP header in a TLP includes a type field, a Fmt field, and a reserved bit, the type field, the Fmt field, the reserved bit, and a TLP extension header in the TLP are used to indicate a data type of data and at least one piece of attribute information corresponding to the data type, and the TLP includes the first TLP and/or the second TLP.

In a possible design, the type field indicates the data type, the Fmt field indicates first attribute information of the data type, the reserved bit indicates second attribute information of the data type, and the TLP extension header indicates third attribute information of the data type.

In a possible design, the type field, the Fmt field, and the reserved bit are jointly coded to indicate the data type, and the TLP extension header is used to indicate the at least one piece of attribute information corresponding to the data type.

In a possible design, the reserved bit includes a ninth bit and/or a thirteenth bit in the TLP header.

In a possible design, the reserved bit includes a ninth bit and/or a thirteenth bit in the TLP header, the type field, the Fmt field, the ninth bit in the TLP header, and the thirteenth bit in the TLP header are grouped into at least two groups of fields, a first group of fields in the at least two groups of fields are used to indicate the data type, each group of fields in the at least two groups of fields except the first group of fields indicate different attribute information corresponding to the data type, and the TLP extension header indicates attribute information, corresponding to the data type, other than the attribute information indicated by the at least two groups of fields.

In a possible design, a value of the type field and/or a value of the Fmt field are/is reserved values/a reserved value.

In a possible design, the TLP header further includes a first field, and the first field indicates attribute information, corresponding to the data type, other than the at least one piece of attribute information.

In a possible design, the first field is a byte 4 to a byte 15 or a byte 4 to a byte 11 of the TLP header.

In a possible design, the first field further includes an identifier of the third node. The processing unit 1901 is configured to determine a routing path based on the identifier of the third node and route information, and the second communication unit is configured to send the second TLP to the third node based on the routing path.

In a possible design, the data type includes any one or more of an image, audio, control-type information, SWRITE, and security.

The apparatus 1900 may be the third node (or a chip or a chip set disposed in the third node or a part that is of the chip and that is configured to perform a function in a related method) in any one of the foregoing embodiments, and the third node may be connected to a second node by using a PCIe bus. The processing unit 1901 may support the apparatus 1900 in executing an action of the third node in the foregoing method examples, or the processing unit 1901 mainly executes an internal action of the third node in the method examples. The communication unit 1902 may support communication between the apparatus 1900 and the second node.

In an embodiment, the communication unit 1902 is configured to receive a TLP from the second node, where the TLP includes a TLP header, a TLP extension header, and data, the TLP header includes a type field, a Fmt field, and a reserved bit, and the type field, the Fmt field, the reserved bit, and the TLP extension header are used to indicate a data type of the data and at least one piece of attribute information corresponding to the data type. The processing unit 1901 is configured to obtain the data based on the data type of the data and the at least one piece of attribute information corresponding to the data type.

In a possible design, the type field indicates the data type, the Fmt field indicates first attribute information of the data type, the reserved bit indicates second attribute information of the data type, and the TLP extension header indicates third attribute information of the data type.

In a possible design, the type field, the Fmt field, and the reserved bit are jointly coded to indicate the data type, and the TLP extension header is used to indicate the at least one piece of attribute information corresponding to the data type.

In a possible design, the reserved bit includes a ninth bit and/or a thirteenth bit in the TLP header.

In a possible design, the reserved bit includes a ninth bit and/or a thirteenth bit in the TLP header, the type field, the Fmt field, the ninth bit in the TLP header, and the thirteenth bit in the TLP header are grouped into at least two groups of fields, a first group of fields in the at least two groups of fields are used to indicate the data type, each group of fields in the at least two groups of fields except the first group of fields indicate different attribute information corresponding to the data type, and the TLP extension header indicates attribute information, corresponding to the data type, other than the attribute information indicated by the at least two groups of fields.

In a possible design, a value of the type field and/or a value of the Fmt field are/is reserved values/a reserved value.

In a possible design, the TLP header further includes a first field, and the first field indicates attribute information, corresponding to the data type, other than the at least one piece of attribute information.

In a possible design, the first field is a byte 4 to a byte 15 or a byte 4 to a byte 11 of the TLP header.

In a possible design, the first field further includes an identifier of the third node.

In a possible design, the data type includes any one or more of an image, audio, control-type information, SWRITE, and security.

It should be understood that the foregoing unit division in the apparatus is merely logical function division. In actual implementation, all or some of the units may be integrated into a same physical entity, or may be physically separated. In addition, all the units in the apparatus may be implemented in a form of software by invoking a processing element; or all the units may be implemented in a form of hardware; or some units may be implemented in a form of software by invoking a processing element, and some units are implemented in a form of hardware. For example, each unit may be a separately disposed processing element, or may be integrated into a chip of the apparatus for implementation, or may be stored in a memory in a form of a program, and a processing element of the apparatus invokes and performs a function of the unit. In addition, all or some of these units may be integrated together, or may be implemented independently. The processing element herein may be a processor, and may be an integrated circuit that has a signal processing capability. In an implementation process, each step or each of the foregoing units in the foregoing methods may be implemented by using an integrated logic circuit of hardware in the processor element or in a form of software by invoking a processing element.

For example, units in any one of the foregoing apparatuses may be one or more integrated circuits configured to implement the foregoing methods, for example, one or more application-specific integrated circuits (ASICs), one or more microprocessors (DSPs), one or more field-programmable gate arrays (FPGAs), or a combination of at least two of these forms of integrated circuits. For another example, when the units in the apparatus may be implemented in a form in which a processing element invokes a program, the processing element may be a processor such as a general CPU, or another processor that can invoke the program. For another example, the units may be integrated together and implemented in a form of a system-on-a-chip sSOC).

The foregoing receiving unit is an interface circuit of the apparatus, and is configured to receive a signal from another apparatus. For example, when the apparatus is implemented in a chip manner, the receiving unit is an interface circuit that is used by the chip to receive a signal from another chip or apparatus. The foregoing sending unit is an interface circuit of the apparatus, and is configured to send a signal to another apparatus. For example, when the apparatus is implemented in a chip manner, the sending unit is an interface circuit that is used by the chip to send a signal to another chip or apparatus.

Figure 20:
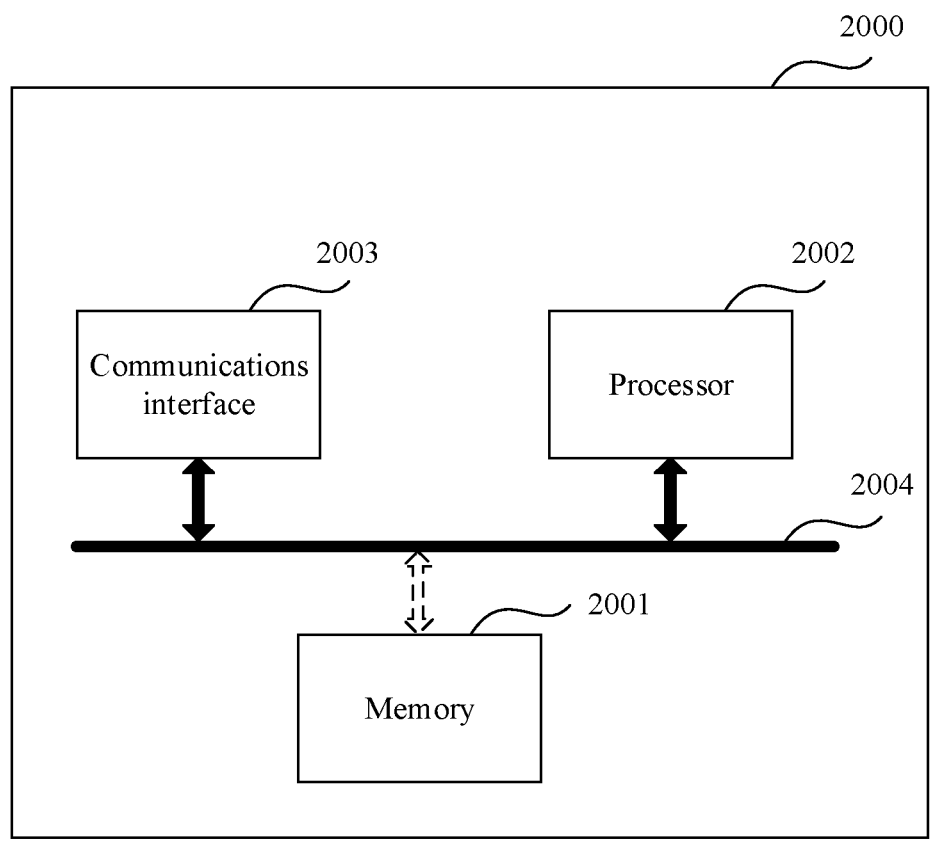
FIG. 20 is a schematic diagram of a structure of another PCIe-based data transmission apparatus according to an embodiment of this disclosure.

FIG. 20 is a schematic diagram of a structure of another PCIe-based data transmission apparatus according to an embodiment of this disclosure. An apparatus 2000 may be the first node, the second node, or the third node in the foregoing embodiments. The apparatus 2000 includes a processor 2002, and may further include a communications interface 2003, and may further include a memory 2001 or is in a coupling relationship with the memory 2001. Optionally, the apparatus 2000 may further include a communication line 2004. The communications interface 2003, the processor 2002, and the memory 2001 may be connected to each other by using the communication line 2004, and the communication line 2004 may be a PCIe bus. The communication line 2004 may be classified into an address bus, a data bus, a control bus, and the like. For ease of representation, only one thick line is used to represent the bus in FIG. 20, but this does not mean that there is only one bus or only one type of bus.

The processor 2002 may be a CPU, a microprocessor, an ASIC, or one or more integrated circuits configured to control program execution of the solution in this disclosure. Functions of the processor 2002 may be the same as those of the processing unit described in FIG. 19.

The communications interface 2003 is configured to communicate with another device or a communication network such as an ethernet, a radio access network (RAN), or a wireless local area network (WLAN) by using any apparatus such as a transceiver. Functions of the communications interface 2003 may be the same as those of the communication unit described in FIG. 19.

The memory 2001 may be a ROM or another type of static storage device that can store static information and an instruction, a RAM or another type of dynamic storage device that can store information and an instruction, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc (DVD), a BLU-RAY disc, and the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor by using the communication line 2004. Alternatively, the memory may be integrated with the processor. The memory 2001 may have a same function as the storage unit described in FIG. 8.

The memory 2001 is configured to store computer-executable instructions for executing the solutions in this disclosure, and execution is controlled by the processor 2002. The processor 2002 is configured to execute the computer-executable instructions stored in the memory 2001, to implement the methods provided in the foregoing embodiments of this disclosure.

Optionally, the computer-executable instructions in embodiments of this disclosure may also be referred to as application program code. This is not limited in embodiments of this disclosure.

An embodiment of this disclosure further provides a computer-readable storage medium, configured to store computer software instructions that need to be performed by the foregoing processor, and the computer software instructions include a program that needs to be performed by the foregoing processor.

A person skilled in the art should understand that embodiments of this disclosure may be provided as a method, a system, or a computer program product. Therefore, this disclosure may use a form of a hardware-only embodiment, a software-only embodiment, or an embodiment with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the other programmable data processing device generate an apparatus for implementing a specific function in one or more processes in the flowcharts and/or in one or more blocks in the block diagrams.

These computer program instructions may alternatively be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the other programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Certainly, a person skilled in the art can make various modifications and variations to this disclosure without departing from the protection scope of this disclosure. This disclosure is intended to cover these modifications and variations of this disclosure provided that they fall within the scope of the claims of this disclosure and equivalent technologies thereof.

What is claimed is:

1. A Peripheral Component Interconnect Express (PCIe)—based data transmission method comprising:

obtaining a transaction layer packet (TLP) comprising a TLP header, a TLP extension header, and a data payload, wherein the TLP extension header is adjacent to the TLP header and adjacent to the data payload in the TLP, wherein the TLP header comprises a type field, a format (Fmt) field, and a reserved bit, wherein the reserved bit comprises a ninth bit in the TLP header or a thirteenth bit in the TLP header, and wherein the type field, the Fmt field, the reserved bit, and the TLP extension header indicate a data type of the data payload and at least one piece of attribute information corresponding to the data type; and sending the TLP to a second node.

2. The PCIe-based data transmission method of claim 1, wherein the type field further indicates the data type, wherein the Fmt field further indicates a first piece of the attribute information, wherein the reserved bit further indicates a second piece of the attribute information, and wherein the TLP extension header further indicates a third piece of the attribute information.

3. The PCIe-based data transmission method of claim 1, further comprising jointly coding the type field, the Fmt field, and the reserved bit to further indicate the data type, wherein the TLP extension header indicates the at least one piece of the attribute information.

4. The PCIe-based data transmission method of claim 1, wherein the PCIe-based data transmission method further comprises grouping the type field, the Fmt field, and the ninth bit or the thirteenth bit in the TLP header into at least two groups of fields, wherein a first group of fields in the at least two groups of fields indicates the data type, wherein each of the at least two groups of fields except the first group of fields indicates a different piece of the attribute information, and wherein the TLP extension header indicates a piece of the attribute information other than the different piece of the attribute information.

5. The method of claim 1, wherein the TLP header further comprises a first field indicating a first piece of the attribute information other than the at least one piece of the attribute information.

6. The method of claim 1, wherein the data type comprises any one or more of an image, audio, control-type information, stream write (SWRITE), or security, wherein first attribute information corresponding to the image includes at least one of an image data type, pixel bit-quantization depth resolution, or segment indication information, wherein second attribute information corresponding to the audio includes at least one of a sampling quantization format, sampling frequency, quantization depth, or a channel quantity, wherein third attribute information corresponding to the control-type information includes at least one of a control-type information type, or a control information amount indication, wherein fourth attribute information corresponding to the security includes at least one of a message type, a format indication, or an encryption indication, and wherein fifth attribute information corresponding to the SWRITE includes an alignment manner.

7. A Peripheral Component Interconnect Express (PCIe)—based data transmission method comprising:

receiving a first transaction layer packet (TLP) from a first node; and sending a second TLP to a third node, wherein the first TLP or the second TLP comprises a TLP header, a TLP extension header, and a data payload, wherein the TLP extension header is adjacent to the TLP header and adjacent to the data payload in the TLP, wherein the TLP header comprises a type field, a format (Fmt) field, and a reserved bit,
wherein the reserved bit comprises a ninth bit in the TLP header or a thirteenth bit in the TLP header, and
wherein the type field, the Fmt field, the reserved bit, and the TLP extension header indicate a data type of the data payload and at least one piece of attribute information corresponding to the data type.

8. The PCIe-based data transmission method of claim 7, wherein the type field further indicates the data type, wherein the Fmt field further indicates a first piece of the attribute information, wherein the reserved bit further indicates a second piece of the attribute information, and wherein the TLP extension header further indicates a third piece of the attribute information.

9. The PCIe-based data transmission method of claim 7, further comprising jointly coding the type field, the Fmt field, and the reserved bit to further indicate the data type, wherein the TLP extension header further indicates the at least one piece of the attribute information.

10. The PCIe-based data transmission method of claim 7, wherein PCIe-based data transmission method further comprises grouping the type field, the Fmt field, and the ninth bit or the thirteenth bit in the TLP header into at least two groups of fields, wherein a first group of fields in the at least two groups of fields indicates the data type, wherein each of the at least two groups of fields except the first group of fields indicates a different piece of the attribute information, and wherein the TLP extension header further indicates a first piece of the attribute information other than the different piece of the attribute information.

11. The PCIe-based data transmission method of claim 7, wherein a first value of the type field or a second value of the Fmt field is a reserved value.

12. The PCIe-based data transmission method of claim 7, wherein the TLP header further comprises a first field indicating a first piece of the attribute information other than the at least one piece of the attribute information.

13. The PCIe-based data transmission method of claim 12, wherein the first field is byte 4 of the TLP header to byte 15 of the TLP header or byte 4 to byte 11 of the TLP header.

14. A Peripheral Component Interconnect Express (PCIe)—based data transmission apparatus comprising:
a processor configured to obtain a transaction layer packet (TLP) comprising a TLP header, a TLP extension header, and a data payload, wherein the TLP extension header is adjacent to the TLP header and adjacent to the data payload in the TLP, wherein the TLP header comprises a type field, a format (Fmt) field, and a reserved bit, wherein the reserved bit comprises a ninth bit in the TLP header or a thirteenth bit in the TLP header, and wherein the type field, the Fmt field, the reserved bit, and the TLP extension header indicate a data type of the data payload and at least one piece of attribute information corresponding to the data type; and
a transceiver coupled to the processor and configured to send the TLP to a second node.

15. The PCIe-based data transmission apparatus of claim 14, wherein the type field further indicates the data type, wherein the Fmt field further indicates a first piece of the attribute information, wherein the reserved bit further indicates a second piece of the attribute information, and wherein the TLP extension header further indicates a third piece of the attribute information.

16. The PCIe-based data transmission apparatus of claim 14, wherein the processor is further configured to jointly code the type field, the Fmt field, and the reserved bit to further indicate the data type, and wherein the TLP extension header further indicates the at least one piece of the attribute information.

17. The PCIe-based data transmission apparatus of claim 14, wherein the data type comprises any one or more of an image, audio, control-type information, stream write (SWRITE), or security, wherein first attribute information corresponding to the image includes at least one of an image data type, pixel bit-quantization depth resolution, or segment indication information, wherein second attribute information corresponding to the audio includes at least one of a sampling quantization format, sampling frequency, quantization depth, or a channel quantity, wherein third attribute information corresponding to the control-type information includes at least one of a control-type information type, or a control information amount indication, wherein fourth attribute information corresponding to the security includes at least one of a message type, a format indication, or an encryption indication, and wherein fifth attribute information corresponding to the SWRITE includes an alignment manner.

18. The PCIe-based data transmission apparatus of claim 14, wherein the processor is further configured to group the type field, the Fmt field, the ninth bit in the TLP header, and the thirteenth bit in the TLP header into at least two groups of fields, wherein a first group of fields in the at least two groups of fields indicates the data type, wherein each of the at least two groups of fields except the first group of fields indicates a different piece of the attribute information, and wherein the TLP extension header further indicates a first piece of the attribute information other than the different piece of the attribute information.

19. The PCIe-based data transmission apparatus of claim 14 wherein a first value of the type field or a second value of the Fmt field is a reserved value.

20. The PCIe-based data transmission apparatus of claim 14, wherein the TLP header further comprises a first field indicating first piece of the attribute information other than the at least one piece of the attribute information.

* * * * *